United States Patent
Wang et al.

(10) Patent No.: US 11,102,701 B2
(45) Date of Patent: Aug. 24, 2021

(54) METHOD, DEVICE AND SYSTEM OF CONTROLLING BLUETOOTH NETWORKING AMONG PHYSICAL DEVICES

(71) Applicants: China Mobile (Hangzhou) Information Technology Co., Ltd., Hangzhou (CN); China Mobile Communications Group Co., Ltd., Beijing (CN)

(72) Inventors: Huan Wang, Beijing (CN); Dong Li, Beijing (CN)

(73) Assignees: China Mobile (Hangzhou) Information Technology Co., Ltd., Hangzhou (CN); China Mobile Communications Group Co., Ltd., Beijing (CN)

( * ) Notice: Subject to any disclaimer, the term of this patent is extended or adjusted under 35 U.S.C. 154(b) by 21 days.

(21) Appl. No.: 16/491,818

(22) PCT Filed: Mar. 5, 2018

(86) PCT No.: PCT/CN2018/078012
§ 371 (c)(1),
(2) Date: Sep. 6, 2019

(87) PCT Pub. No.: WO2018/161873
PCT Pub. Date: Sep. 13, 2018

(65) Prior Publication Data
US 2020/0045611 A1 Feb. 6, 2020

(30) Foreign Application Priority Data
Mar. 7, 2017 (CN) .......................... 201710131562.3

(51) Int. Cl.
H04W 12/04 (2021.01)
H04W 40/30 (2009.01)
(Continued)

(52) U.S. Cl.
CPC ............. *H04W 40/30* (2013.01); *H04W 4/80* (2018.02); *H04W 76/11* (2018.02); *H04W 80/02* (2013.01); *H04W 84/20* (2013.01)

(58) Field of Classification Search
CPC ....... H04W 40/30; H04W 4/80; H04W 76/11; H04W 80/02; H04W 84/20
See application file for complete search history.

(56) References Cited

U.S. PATENT DOCUMENTS

2004/0136338 A1 7/2004 Ting-Yu et al.
2005/0148360 A1 7/2005 Uchiyama
(Continued)

FOREIGN PATENT DOCUMENTS

CN 1956398 A 5/2007
CN 101938298 A 1/2011
(Continued)

OTHER PUBLICATIONS

Chinese Office Action (First) dated Nov. 5, 2019, for Chinese Patent Application No. 201710131562.3, 11 pages.
(Continued)

*Primary Examiner* — Brandon M Renner
(74) *Attorney, Agent, or Firm* — Morgan, Lewis & Bockius LLP

(57) ABSTRACT

A method, a device and a system of controlling Bluetooth networking among physical devices are provided. The method includes: establishing a Bluetooth networking strategy list in advance, wherein the Bluetooth networking strategy list includes one or more Bluetooth networking strategies inputted or selected by a user in accordance with
(Continued)

a pre-established correspondence relation between master and slave physical devices; receiving a Bluetooth-networking-strategy selection instruction; and transmitting a selected Bluetooth networking strategy in accordance with the Bluetooth-networking-strategy selection instruction to a network server, such that the Bluetooth networking strategy is forwarded by the network server to the master physical device, wherein the Bluetooth networking strategy is used to trigger the master physical device to adjust a Bluetooth networking relation between the master and the slave physical devices.

12 Claims, 7 Drawing Sheets

(51) Int. Cl.
| | | |
|---|---|---|
| *H04W 4/80* | (2018.01) | |
| *H04W 76/11* | (2018.01) | |
| *H04W 80/02* | (2009.01) | |
| *H04W 84/20* | (2009.01) | |

(56) References Cited

U.S. PATENT DOCUMENTS

| | | | | |
|---|---|---|---|---|
| 2012/0057518 A1* | 3/2012 | Herrala | ............... | H04W 84/20 |
| | | | | 370/315 |
| 2013/0325952 A1 | 12/2013 | Draznin et al. | | |
| 2015/0324181 A1* | 11/2015 | Segal | ............... | H04W 52/0264 |
| | | | | 717/178 |
| 2016/0105406 A1* | 4/2016 | Smith | ............... | H04W 60/00 |
| | | | | 713/171 |
| 2016/0157168 A1* | 6/2016 | Xue | ............... | H04L 61/6022 |
| | | | | 370/329 |
| 2017/0019935 A1* | 1/2017 | Palin | ............... | H04W 12/50 |
| 2017/0047968 A1* | 2/2017 | Moshfeghi | ............... | H04B 7/0617 |
| 2017/0231022 A1 | 8/2017 | Ito et al. | | |
| 2019/0197807 A1* | 6/2019 | Kim | ............... | G08C 17/02 |

FOREIGN PATENT DOCUMENTS

| | | |
|---|---|---|
| CN | 104918235 A | 9/2015 |
| CN | 105099517 A | 11/2015 |
| CN | 105163236 A | 12/2015 |
| CN | 105306332 A | 2/2016 |
| CN | 105472771 A | 4/2016 |
| CN | 106102184 A | 11/2016 |
| JP | 2005-197880 A | 7/2005 |
| JP | 2005-217463 A | 8/2005 |
| WO | WO 2016/088185 A1 | 6/2016 |
| WO | WO 2016/195825 A1 | 12/2016 |

OTHER PUBLICATIONS

English Translation of Chinese Office Action (First) dated Nov. 5, 2019, for Chinese Patent Application No. 201710131562.3, 10 pages.
Chinese International Search Report with Written Opinion dated Jun. 1, 2018, for PCT/CN2018/078012, 8 pages.
International Search Report with Written Opinion (in English) dated Jun. 1, 2018, for PCT/CN2018/078012, 5 pages.
Japanese Office Action dated Nov. 9, 2020, for Japanese Patent Application No. 2019-570610, 6 pages.
English Translation of Japanese Office Action dated Nov. 9, 2020, for Japanese Patent Application No. 2019-570610, 6 pages.

* cited by examiner

METHOD, DEVICE AND SYSTEM OF CONTROLLING BLUETOOTH NETWORKING AMONG PHYSICAL DEVICES

CROSS-REFERENCE TO RELATED APPLICATION

This application is a U.S. national phase application of a PCT Application No. PCT/CN2018/078012 filed on Mar. 5, 2018, which claims a priority of the Chinese patent application No. 201710131562.3 filed in China on Mar. 7, 2017, a disclosure of which is incorporated herein by reference in its entirety.

TECHNICAL FIELD

The present disclosure relates to the field of Internet of Things (IoT), and in particular, relates to a method, a device and a system of controlling Bluetooth networking among physical devices.

BACKGROUND

A Bluetooth wireless technology has features such as a low transmission power, a low cost and a short communication range. Therefore, the Bluetooth wireless technology may be used to replace cables between electronic devices and form temporary network connections via short-range wireless links without supports from stationary network infrastructures. Multiple Bluetooth devices may be connected together to form a Piconet, referring to a structure of the Piconet as shown in FIG. 1. Among the Bluetooth devices in the Piconet, there are only one Master device (as illustrated by a device 10 in FIG. 1) and one or more Slave devices (as illustrated by devices 11 in FIG. 1), where the Master device is a Bluetooth device that initiates voluntarily a connection request during a networking procedure. According to a related Bluetooth networking technology, an interactive process between the Master device and each Slave device includes following steps 1-3.

Step 1: a user operates the Master device so that the Master device initiates a call and looks for Slave devices in a signal coverage of the Master device.

Step 2: after the Slave devices are found by the Master device, a Slave device desired to be connected with is selected and then a Personal Identification Number (PIN) of the Slave device is inputted.

Step 3: after the Slave device is authenticated and a pairing between the Slave device and the Master device is achieved, a two-way link is established successfully, and the Slave device may record trust information of the Master device; from this point on, the Master device and the Slave device may start two-way communication between them.

However, the foregoing technical solution suffers from following drawbacks: (1) a networking relation between the Master device and the Slave device cannot be operated on remotely; (2) the pairing between the Master device and the Slave device has to be performed on the Master device; in this case, it is needed that the Master device is provided with an operator interface or other applications for the pairing between the Master device and the Slave device, leading to low flexibility; and a modification of the networking among the Master device and Slave devices cannot be achieved without involvements of the Master device and the Slave devices; (3) a multitude of flexible networking strategies cannot be implemented and an automatic switchover among different networking strategies based on different dates and time is impossible; (4) a backup, edit or restore of the networking relation among the Master device and the Slave devices is impossible.

Additionally, in a distributed network topology structure for Bluetooth devices or in a novel MESH topology structure for Bluetooth devices, the Bluetooth devices play more diversified roles. However, due to limitations of specific hardware forms, operations and interactions among the Bluetooth devices are not improved, problems such as inconvenience in initially establishing association relations or networking relations among the Bluetooth devices, allocating roles of the Bluetooth devices, switching or editing a networking strategy or a role in the networking strategy still exist, therefore severely affecting user's experience and development of the Bluetooth technology.

In conclusion, how to simplify a pairing procedure between the Master device and the Slave device, how to achieve the pairing between the Master device and the Slave device independent of the Master device, how to operate on (such as edit or backup) a Bluetooth networking relation between the Master device and the Slave device remotely, how to configure flexibly Bluetooth networking strategies among the Master device and the Slave device, and how to switch flexibly among the Bluetooth networking strategies based on different time points remain problems to be solved urgently.

SUMMARY

The present disclosure provides a method, a device and a system of controlling establishment of Bluetooth network relations (referred to as "Bluetooth networking" hereinafter) among physical devices, in order to solve problems of inconvenience in initially establishing the Bluetooth networking and inflexible configuration in related art.

In a first aspect, a method of controlling Bluetooth networking among physical devices is provided. The method includes: establishing a Bluetooth networking strategy list in advance, wherein the Bluetooth networking strategy list includes one or more Bluetooth networking strategies, and the one or more Bluetooth networking strategies are inputted or selected by a user in accordance with a pre-established correspondence relation between a master physical device and a slave physical device; receiving a Bluetooth-networking-strategy selection instruction; and transmitting, to a network server, a selected Bluetooth networking strategy in accordance with the Bluetooth-networking-strategy selection instruction, such that the Bluetooth networking strategy is forwarded by the network server to the master physical device, wherein the Bluetooth networking strategy is used to trigger the master physical device to adjust a Bluetooth networking relation between the master physical device and the slave physical device.

Optionally the correspondence relation between the master physical device and the slave physical device is established by: acquiring a device identifier (ID) and a corresponding identity ID of each physical device to be Bluetooth-networked; establishing the correspondence relation between the master physical device and the slave physical device in accordance with the acquired device ID and the corresponding identity ID of the physical device to be Bluetooth-networked; and transmitting the established correspondence relation between the master physical device and the slave physical device to the network server for storage.

Optionally, the device ID of each physical device is acquired in a following manner: acquiring the device ID of the physical device to be Bluetooth-networked by scanning a graphic authentication code of the physical device; or acquiring the device ID of the physical device to be Bluetooth-networked by receiving a device code of the physical device inputted by the user.

Optionally, the graphic authentication code is generated based on a Medium Access Control (MAC) address of the physical device, and the graphic authentication code includes a Quick Response code or a bar code.

In a second aspect, a method of controlling Bluetooth networking among physical devices is provided in the present disclosure. The method includes receiving a Bluetooth networking strategy transmitted by a network server, wherein the Bluetooth networking strategy is selected by a user from a Bluetooth networking strategy list established by a terminal in advance and is transmitted to the network server, the Bluetooth networking strategy list includes one or more Bluetooth networking strategies, and the one or more Bluetooth networking strategies included in the Bluetooth networking strategy list are inputted or selected by the user in accordance with a pre-established correspondence relation between a master physical device and a slave physical device; and adjusting a Bluetooth networking relation between a master physical device and a slave physical device in accordance with the Bluetooth networking strategy.

Optionally, the Bluetooth networking strategy includes device identifiers (IDs) of all slave physical devices whose Bluetooth networking relations need to be adjusted; and the adjusting the Bluetooth networking relation between the master physical device and the slave physical device in accordance with the Bluetooth networking strategy, includes: determining a first device ID set based on device IDs of all slave physical devices whose Bluetooth networking relations need to be adjusted; searching all slave physical devices within a signal coverage and determining a second device ID set made up of device IDs of slave physical devices successfully searched; and selecting, from the second device ID set, a device ID identical to any device ID in the first device ID set and establishing a communication connection with a slave physical device corresponding to the selected device ID.

Optionally, the Bluetooth networking strategy further includes a Bluetooth networking mode, and the Bluetooth networking mode includes a mode of establishing a connection automatically, a mode of establishing a connection based on manual operation or a mode of establishing a connection based on time.

Optionally, in a case that the Bluetooth networking mode is the mode of establishing the connection based on manual operation, before selecting, from the second device ID set, the device ID identical to any device ID in the first device ID set and establishing the communication connection with the slave physical device corresponding to the selected device ID, the method further includes: transmitting a communication connection establishment enquiry request to the terminal via the network server; receiving a communication connection establishment response message sent from the terminal and forwarded by the network server; and determining the communication connection establishment response message indicates that establishment of the communication connection is agreed.

Optionally, in a case that the Bluetooth networking mode is the mode of establishing the connection based on time, the Bluetooth networking strategy further includes a networking time window; and selecting, from the second device ID set, the device ID identical to any device ID in the first device ID set and establishing the communication connection with the slave physical device corresponding to the selected device ID, the method further includes: selecting, from the second device ID set according to the networking time window, the device ID identical to any device ID in the first device ID set and establishing the communication connection with the slave physical device corresponding to the selected device ID, when a start time of the networking time window is reached. The method further includes: releasing, according to the networking time window, the communication connection with a slave physical device having established the communication connection, when an end time of the networking time window is reached.

In a third aspect, a device of controlling Bluetooth networking among physical devices is provided in the present disclosure. The device includes an establishing unit, configured to establish a Bluetooth networking strategy list in advance, wherein the Bluetooth networking strategy list includes one or more Bluetooth networking strategies, and the one or more Bluetooth networking strategies are inputted or selected by a user in accordance with a pre-established correspondence relation between a master physical device and a slave physical device; a reception unit, configured to receive a Bluetooth-networking-strategy selection instruction; and a transmission unit, configured to transmit, to a network server, a selected Bluetooth networking strategy in accordance with the Bluetooth-networking-strategy selection instruction received by the reception unit, such that the Bluetooth networking strategy is forwarded by the network server to the master physical device, wherein the Bluetooth networking strategy is used to trigger the master physical device to adjust a Bluetooth networking relation between the master physical device and a slave physical devices.

Optionally, the establishing unit includes an acquisition subunit, an establishing subunit and a transmission subunit, wherein, the acquisition subunit is configured to acquire a device identifier (ID) and a corresponding identity ID of each of physical devices to be Bluetooth-networked; the establishing subunit is configured to establish the correspondence relation between the master physical device and the slave physical device in accordance with the acquired device ID and the corresponding identity ID of each of the physical devices to be Bluetooth-networked; and the transmission subunit is configured to transmit the established correspondence relation established by the establishing subunit between the master physical device and the slave physical device to the network server for storage.

Optionally, the acquisition subunit is specifically configured to: acquire the device ID of any one of the physical devices to be Bluetooth-networked by scanning a graphic authentication code of the physical device; or acquire the device ID of any one of the physical devices to be Bluetooth-networked by receiving a device code of the physical device inputted by the user.

Optionally, the graphic authentication code is generated based on a Medium Access Control (MAC) address of the physical device, and the graphic authentication code includes a Quick Response code or a bar code.

In a fourth aspect, a device of controlling Bluetooth networking among physical devices is provided in the present disclosure. The device includes: a reception unit, configured to receive a Bluetooth networking strategy transmitted by a network server, wherein the Bluetooth networking strategy is selected by a user from a Bluetooth networking strategy list established by a terminal in advance and is transmitted to the network server, the Bluetooth networking strategy list includes one or more Bluetooth networking strategies, and the one or more Bluetooth networking strategies included in the Bluetooth networking strategy list are inputted or selected by the user in accordance with a pre-established correspondence relation between a master physical device and a slave physical device; and an adjusting unit, configured to adjust a Bluetooth networking relation between a master physical device and a slave physical device in accordance with the Bluetooth networking strategy.

Optionally, the Bluetooth networking strategy includes a device identifier (ID) of the slave physical device whose Bluetooth networking relation needs to be adjusted; and the adjusting unit includes a determination subunit, a searching subunit and a selecting subunit, wherein the determination subunit is configured to determine a first device ID set based on device IDs of all slave physical devices whose Bluetooth networking relations need to be adjusted; the searching subunit is configured to search all slave physical devices within a signal coverage and determine a second device ID set made up of device IDs of slave physical devices successfully searched; and the selecting subunit is configured to select, from the second device ID set, a device ID identical to any device ID in the first device ID set and establish a communication connection with a slave physical device corresponding to the selected device ID.

Optionally, the Bluetooth networking strategy further includes a Bluetooth networking mode, and the Bluetooth networking mode includes a mode of establishing a connection automatically, a mode of establishing a connection based on manual operation or a mode of establishing a connection based on time.

Optionally, the device further includes a transmission unit and a determination unit, wherein the transmission unit is configured to, in a case that the Bluetooth networking mode is the mode of establishing the connection based on manual operation, transmit a communication connection establishment enquiry request to the terminal via the network server, before the selecting subunit selects, from the second device ID set, the device ID identical to any device ID in the first device ID set and establishes the communication connection with the slave physical device corresponding to the selected device ID; the reception unit is further configured to receive a communication connection establishment response message sent from the terminal and forwarded by the network server; and the determination unit is configured to determine the communication connection establishment response message indicates that establishment of the communication connection is agreed.

Optionally, in a case that the Bluetooth networking mode is the mode of establishing the connection based on time, the Bluetooth networking strategy further includes a networking time window; and the selecting subunit is configured to select, from the second device ID set according to the networking time window, the device ID identical to any device ID in the first device ID set and establish the communication connection with the slave physical device corresponding to the selected device ID, when a start time of the networking time window is reached; and the device further includes a releasing unit, the releasing unit is configured to release, according to the networking time window, the communication connection with a slave physical device having established the communication connection, when an end time of the networking time window is reached.

In a fifth aspect, a system of controlling Bluetooth networking among physical devices is provided in the present disclosure. The system includes: a terminal, a network server and at least one master physical device, wherein each of the at least one master physical device is connected to one or more slave physical devices, the terminal is configured to establish a Bluetooth networking strategy list in advance, wherein the Bluetooth networking strategy list includes one or more Bluetooth networking strategies, and the one or more Bluetooth networking strategies are inputted or selected by a user in accordance with a pre-established correspondence relation between the master physical device and the slave physical device; receive a Bluetooth-networking-strategy selection instruction; and transmit, to a network server, a selected Bluetooth networking strategy in accordance with the Bluetooth-networking-strategy selection instruction; the network server is configured to receive the selected Bluetooth networking strategy transmitted by the terminal, and forward the Bluetooth networking strategy to the master physical device; and the master physical device is configured to receive the Bluetooth networking strategy transmitted by the network server, and adjust a Bluetooth networking relation between the master physical device and the slave physical device in accordance with the Bluetooth networking strategy.

Optionally, the terminal is specifically configured to acquire a device identifier (ID) and a corresponding identity ID of each physical device to be Bluetooth-networked; establish the correspondence relation between the master physical device and the slave physical device in accordance with the acquired device ID and the corresponding identity ID of the physical device to be Bluetooth-networked; and transmit the established correspondence relation between the master physical device and the slave physical device to the network server; and the network server is further configured to store the correspondence relation between the master physical device and the slave physical device transmitted by the terminal.

Optionally, the terminal is specifically configured to: acquire the device ID of the physical device to be Bluetooth-networked by scanning a graphic authentication code of the physical device; or acquire the device ID of the physical device to be Bluetooth-networked by receiving a device code of the physical device inputted by the user.

Optionally, the graphic authentication code is generated based on a Medium Access Control (MAC) address of the physical device, and the graphic authentication code includes a Quick Response code or a bar code.

Optionally, the Bluetooth networking strategy includes device identifiers (IDs) of all slave physical devices whose Bluetooth networking relations need to be adjusted; and the master physical device is specifically configured to determine a first device ID set based on device IDs of all slave physical devices whose Bluetooth networking relations need to be adjusted; search all slave physical devices within a signal coverage and determine a second device ID set made up of device IDs of slave physical devices successfully searched; and select, from the second device ID set, a device ID identical to any device ID in the first device ID set and establish a communication connection with a slave physical device corresponding to the selected device ID.

Optionally, the Bluetooth networking strategy further includes a Bluetooth networking mode, and the Bluetooth networking mode includes a mode of establishing a connection automatically, a mode of establishing a connection based on manual operation or a mode of establishing a connection based on time.

Optionally, the master physical device is configured to, in a case that the Bluetooth networking mode is the mode of establishing the connection based on manual operation, transmit a communication connection establishment enquiry request to the network server; receive a communication connection establishment response message sent from the terminal and forwarded by the network server; and determine the communication connection establishment response message indicates that establishment of the communication connection is agreed, before the master physical device selects, from the second device ID set, the device ID identical to any device ID in the first device ID set and establishes the communication connection with the slave physical device corresponding to the selected device ID; the network server is specifically configured to transmit the communication connection establishment enquiry request to the terminal; receive the communication connection establishment response message transmitted by the terminal; and forward the communication connection establishment response message to the master physical device; and the terminal is specifically configured to receive the communication connection establishment enquiry request transmitted by the network server and transmit the communication connection establishment response message to the network server.

Optionally, in a case that the Bluetooth networking mode is the mode of establishing the connection based on time, the Bluetooth networking strategy further includes a networking time window; the master physical device is specifically configured to: select, from the second device ID set according to the networking time window, the device ID identical to any device ID in the first device ID set and establish the communication connection with the slave physical device corresponding to the selected device ID, when a start time of the networking time window is reached; and release, according to the networking time window, the communication connection with a slave physical device having established the communication connection, when an end time of the networking time window is reached.

In a sixth aspect, a device of controlling Bluetooth networking among physical devices is provided in the present disclosure. The device includes: a processor; a storage, configured to store a program and data; and a bus interface, configured to allow for communication between the processor and the storage, wherein the processor is configured to read and execute the program and data stored in the storage, to control the device to implement the method according to the first aspect.

In a seventh aspect, a device of controlling Bluetooth networking among physical devices is provided in the present disclosure. The device includes: a processor; a storage, configured to store a program and data; and a bus interface, configured to allow for communication between the processor and the storage, wherein the processor is configured to read and execute the program and data stored in the storage, to control the device to implement the method according to the second aspect.

In an eighth aspect, a non-volatile storage medium is provided in the present disclosure. The medium includes a computer program and data stored on the non-volatile storage medium, wherein when the computer program and the data is executed by a processor, the processor implements the method according to the first aspect.

In a ninth aspect, a non-volatile storage medium is provided in the present disclosure. The medium includes a computer program and data stored on the non-volatile storage medium, wherein when the computer program and the data is executed by a processor, the processor implements the method according to the second aspect.

In the method, the device and the system of controlling Bluetooth networking among physical devices provided by the present disclosure, a Bluetooth networking strategy list including one or more Bluetooth networking strategies is established in advance, such that the master physical device adjusts flexibly Bluetooth networking relations between a master physical device and slave physical devices in accordance with the Bluetooth networking strategy; and the master physical device receives the Bluetooth networking strategy transmitted by the network server, such that the Bluetooth networking relations between the master physical device and the slave physical devices may be controlled remotely, thereby changing a flow of controlling the Bluetooth networking relations between the master physical device and the slave physical devices by directly operating the master physical device in related art, simplifying the pairing process between a Master device and a Slave device and enhancing user experience.

Additional features and advantages of the present disclosure are set forth hereinafter, and will become apparent in part from the following description or will be learned by practice of the present disclosure. The objective or other advantages may be achieved or obtained by a structure specifically pointed out in the description, claims and accompanying drawings.

BRIEF DESCRIPTION OF THE DRAWINGS

Drawings illustrated herein are used to provide a thorough understanding of the present disclosure, and constitute a part of the present disclosure. Exemplary embodiments of the present disclosure and descriptions thereof are provided to explain the present disclosure and by no means constitute any undue limitation on the present disclosure. In the drawings.

DETAILED DESCRIPTION

The present disclosure provides a method, a device and a system of controlling Bluetooth networking among physical devices, so as to solve problems in related art such as the pairing procedure between a Master device and a Slave device is complex, the pairing procedure between the Master device and the Slave device cannot be controlled remotely and a configuration process of the pairing procedure is inflexible.

The method of controlling Bluetooth networking among physical devices provided by the present disclosure is applicable to a control process of networking among Bluetooth devices. With the method provided by the present disclosure, Bluetooth networking relations between master and slave Bluetooth devices may be adjusted flexibly, and the pairing procedure between the master and slave Bluetooth devices is simplified, thereby enhancing user experience.

It is noted that optional embodiments of the present disclosure below are described with reference to accompanying drawings. It is to be understood that the optional embodiments described herein are exemplary, solely for a purpose of illustration and explanation of the present disclosure and in no way limit the present disclosure, and embodiments or features of the embodiments in the present disclosure may be combined with each other under a condition that no conflict may be caused.

A technical solution of controlling Bluetooth networking among physical devices provided in some embodiments of the present disclosure may be implemented in a terminal, such as smart phone and a tablet computer.

Figure 2A:
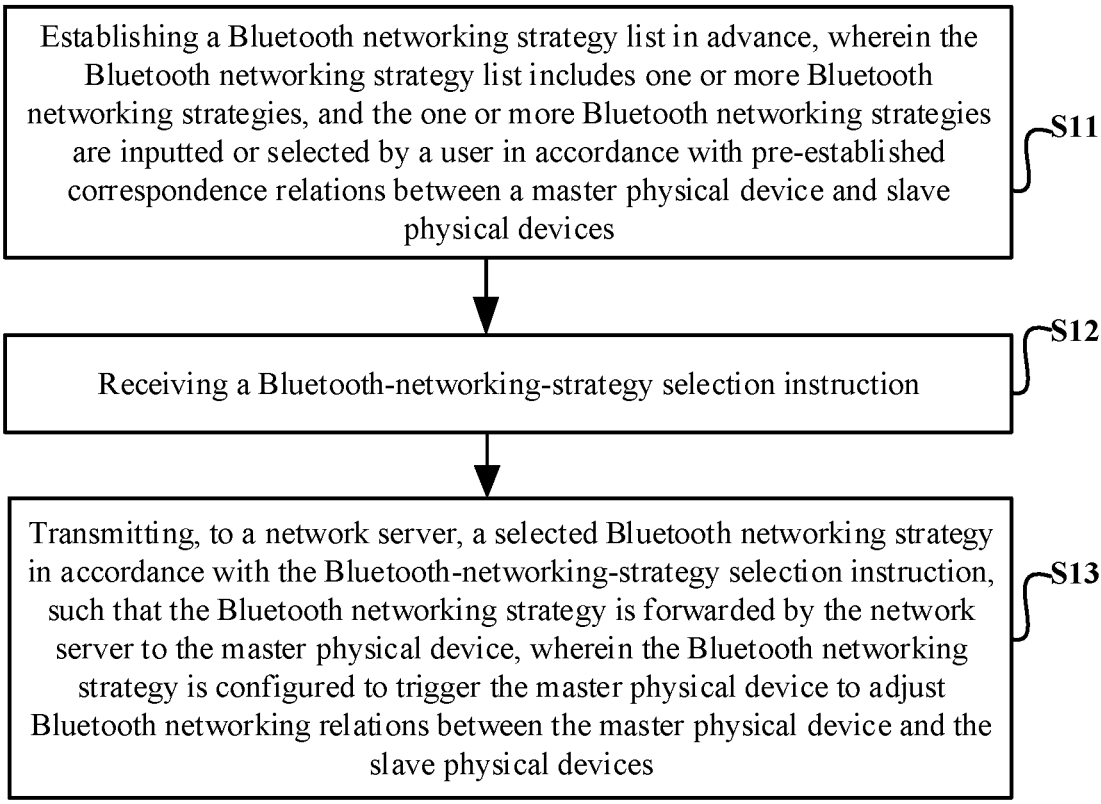
FIG. 2a is a schematic flow diagram of a method of controlling Bluetooth networking among physical devices provided by the present disclosure.

Referring to FIG. 2a, a schematic flow diagram of a method of controlling Bluetooth networking among physical devices provided by the present disclosure is illustrated in FIG. 2a. The method for controlling Bluetooth networking among physical devices may include the following steps S11 to S13.

S11: establishing a Bluetooth networking strategy list in advance, wherein the Bluetooth networking strategy list includes one or more Bluetooth networking strategies, and the one or more Bluetooth networking strategies are inputted or selected by a user in accordance with pre-established correspondence relations between a master physical device and slave physical devices.

In a specific implementation, for example, a master physical device 1 may correspond to a slave physical device 11, a slave physical device 12 and a slave physical device 13. The terminal displays the correspondence relations to a user, and the user may select a Bluetooth networking strategy from the Bluetooth networking strategy list or input a Bluetooth networking strategy in accordance with the correspondence relations. By selecting a Bluetooth networking strategy in accordance with Bluetooth networking relations between the master physical device and the slave physical devices, it is effectively ensured that the master physical device may configure flexibly the Bluetooth networking relations between the master physical device and the slave physical devices based on the Bluetooth networking strategies.

Optionally, in order to enhance user experience, some embodiments of the present disclosure propose to provide a user interactive interface of the terminal with a strategy switch button; the strategy switch button is configured to trigger a strategy switch operation upon actuated by a user, that is, upon the user actuating the button, the Bluetooth networking strategy is switched over periodically; the switched Bluetooth networking strategy is transmitted to a network server, and then forwarded by the network server to the master physical device.

Figure 2B:
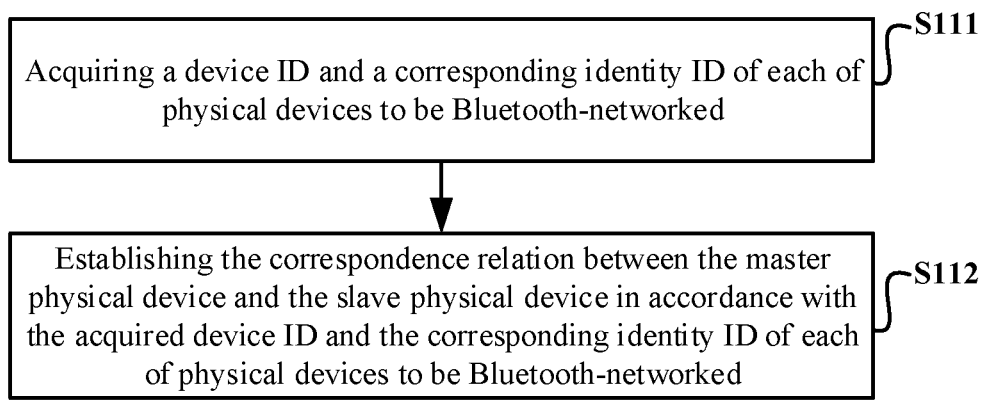
FIG. 2b is a schematic flow diagram of a process of establishing a correspondence relation between a master physical device and a slave physical device according to the method of controlling Bluetooth networking among physical devices provided by the present disclosure.

Optionally, the correspondence relation between the master physical device and the slave physical devices may be established by means of a method as shown in FIG. 2b. FIG. 2b may include following steps S111 to S112.

S111: acquiring a device identifier (ID) and a corresponding identity ID of each of the physical devices to be Bluetooth-networked.

In a specific implementation, the identity ID of the physical device is configured to indicate whether the device is a master physical device or a slave physical device. For example, during a registration process of a physical device, the user may ascertain whether the device is a master physical device or a slave physical device based on a position of the device relative to other physical devices, and click on a master physical device button or a slave physical device button in the user interface to bring out a corresponding interface, the corresponding interface is configured to instruct the user to acquire the device ID of the master physical device or the slave physical device.

In a specific implementation, some embodiments of the present disclosure provide two approaches of acquiring the device ID of a physical device, which are detailed as follows.

The first approach: acquiring, by scanning a graphic authentication code of any physical device of the physical devices to be Bluetooth-networked, a device ID of the physical device.

In a specific implementation, when the user clicks on the master physical device button or the slave physical device button in the user interface of the terminal, the terminal generates a corresponding scan interface and instructs the user to align the scan interface with the graphic authentication code of the master physical device or the slave physical device, thereby the terminal may acquire the graphic authentication code of the master physical device or the slave physical device and identify the device ID of the master physical device or the slave physical device in the graphic authentication code.

Optionally, a graphic authentication code is generated based on a Medium Access Control (MAC) address of a physical device, and the graphic authentication code includes a Quick Response (QR) code or a bar code.

The second approach: acquiring, by receiving a device code of any to-be-Bluetooth-networked physical device of the physical devices inputted by the user, a device ID of the physical device.

In a specific implementation, when the user clicks on the master physical device button or the slave physical device button in the user interface of the terminal, the terminal generates a corresponding dialogue box to instruct the user to acquire the device ID from a body of the master physical device or the slave physical device and input the acquired device ID into the dialogue box. The terminal is thence provided with the device ID and the corresponding identity ID of the master physical device or the slave physical device.

S112: establishing the correspondence relation between the master physical device and the slave physical device in accordance with the acquired device ID and the corresponding identity ID of each physical device of physical devices to be Bluetooth-networked.

In a specific implementation, taking a scenario including one master physical device and three slave physical devices for example, the established correspondence relations between the master physical device and the slave physical devices may be as shown in the following table 1:

TABLE 1

| Identity ID | Device ID | Identity ID | Device ID |
|---|---|---|---|
| Master physical device | MAC | Slave physical device1 | MAC1 |
| | | Slave physical device2 | MAC2 |
| | | Slave physical device 3 | MAC3 |

The Bluetooth networking strategy may be determined based on the pre-established correspondence relations between the master physical device and the slave physical devices.

S12: receiving a Bluetooth-networking-strategy selection instruction.

S13: transmitting, to a network server, a selected Bluetooth networking strategy in accordance with the Bluetooth-networking-strategy selection instruction, such that the Bluetooth networking strategy is forwarded by the network server to the master physical device, wherein the Bluetooth networking strategy is used to trigger the master physical device to adjust Bluetooth networking relations between the master physical device and the slave physical devices.

After the terminal has received the Bluetooth-networking-strategy selection instruction, the terminal transmits the selected Bluetooth networking strategy to the network server, thereby a remote control of the Bluetooth networking relations between the master physical device and the slave physical devices may be achieved. The selected Bluetooth networking strategy is forwarded by the network server to the master physical device.

The method further includes: transmitting the established correspondence relations between the master physical device and the slave physical devices to the network server for storage. Thus, the network server may store and backup the correspondence relations between the master physical device and the slave physical devices.

According to the method of controlling Bluetooth networking among physical devices provided by the present disclosure, a terminal establishes a Bluetooth networking strategy list in advance, wherein the Bluetooth networking strategy list includes one or more Bluetooth networking strategies, and the one or more Bluetooth networking strategies are inputted or selected by a user in accordance with pre-established correspondence relations between a master physical device and slave physical devices; after the terminal has established the Bluetooth networking strategy list, the terminal receives a Bluetooth-networking-strategy selection instruction; and the terminal transmits to a network server a Bluetooth networking strategy selected in accordance with the Bluetooth-networking-strategy selection instruction, such that the Bluetooth networking strategy is forwarded by the network server to the master physical device, wherein the Bluetooth networking strategy is used to trigger the master physical device to adjust Bluetooth networking relation between the master physical device and the slave physical devices. Thereby, the Bluetooth networking relations between the master physical device and the slave physical devices may be controlled remotely, and the pairing between the master and slave physical devices may further be achieved through a remote operation; in addition, the Bluetooth networking relations between the master physical device and the slave physical devices may be configured flexibly since various Bluetooth networking strategies are provided, thus enhancing user experience.

Figure 3A:
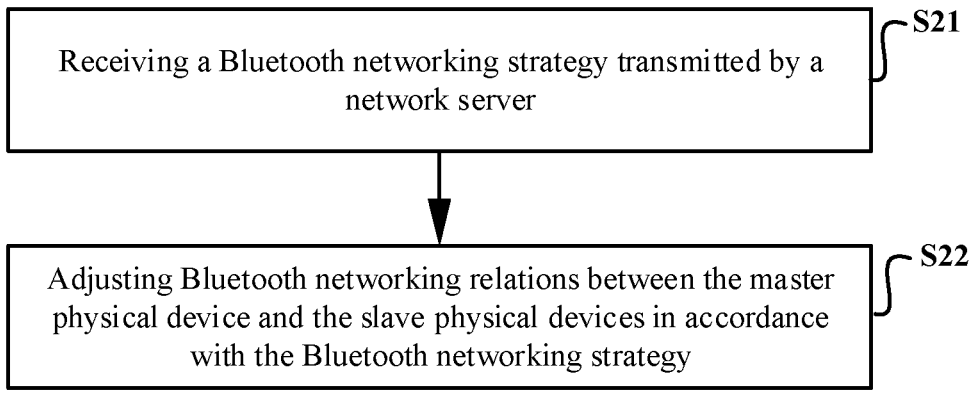
FIG. 3a is a schematic flow diagram of a method of controlling Bluetooth networking among physical devices provided by the present disclosure.

Referring to FIG. 3a, another schematic flow diagram of a method of controlling Bluetooth networking among physical devices provided by the present disclosure is illustrated. The method may include following steps S21 to S22.

S21: receiving a Bluetooth networking strategy transmitted by a network server.

In a specific implementation, the Bluetooth networking strategy is selected by a user from a Bluetooth networking strategy list established by the terminal in advance and is transmitted to the network server, the Bluetooth networking strategy list includes one or more Bluetooth networking strategies, and one or more Bluetooth networking strategies included in the Bluetooth networking strategy list are inputted or selected by the user in accordance with pre-established correspondence relations between a master physical device and slave physical devices.

S22: adjusting Bluetooth networking relations between the master physical device and the slave physical devices in accordance with the Bluetooth networking strategy.

In a specific implementation, the Bluetooth networking strategy is inputted or selected by the user in accordance with the correspondence relations between the master physical device and the slave physical devices, for example, correspondence relations exist between a master physical device 1 and three slave physical devices which are a slave physical device 11, a slave physical device 12 and a slave physical device 13. If the Bluetooth networking strategy received by the master physical device 1 indicates a communication connection between the master physical device 1 and the slave physical device 12 is to be established, then in accordance with the Bluetooth networking strategy and the correspondence relations between the master physical device 1 and the three slave physical devices, the communication connection between the master physical device and the slave physical device 12 may be established and communication connections between the master physical device and the slave physical devices 11 and 13 may be disconnected. Therefore, the master physical device may establish or terminate the Bluetooth networking relations between the master physical device and the slave physical devices automatically in accordance with the Bluetooth networking strategy, without needing for the user to operate the master physical device manually to achieve the Bluetooth networking relations between the master physical device and the slave physical devices, thereby offering a simple and easy operation and an enhanced user experience.

Figure 3B:
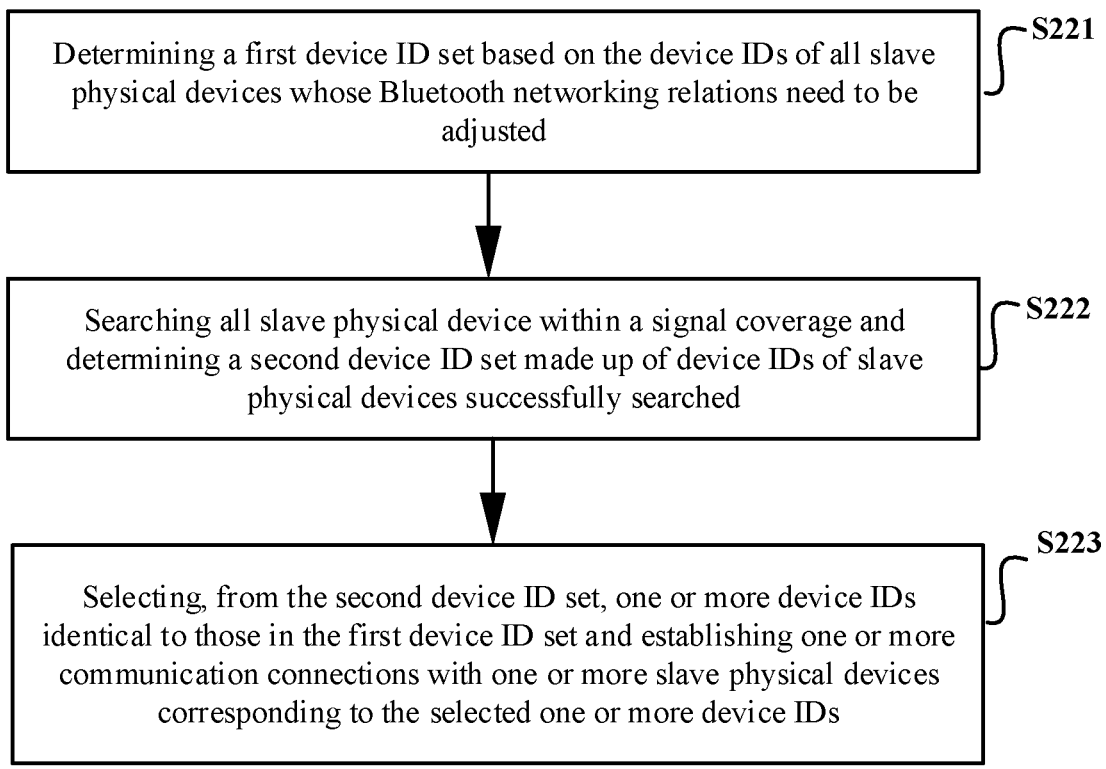
FIG. 3b is a schematic flow diagram of a process of adjusting a Bluetooth networking relation between the master physical device and the slave physical device according to the method of controlling Bluetooth networking among physical devices provided by the present disclosure.

Optionally, to facilitate understanding the present disclosure more thoroughly, the Bluetooth networking strategy includes device IDs of slave physical devices whose Bluetooth networking relations need to be adjusted. When performing the step S22, the Bluetooth networking relations between the master physical device and the slave physical devices may be adjusted according to the method as shown in FIG. 3b, the step 22 may include following substeps S221 to S223.

S221: determining a first device ID set based on the device IDs of the slave physical devices whose Bluetooth networking relations need to be adjusted.

In a specific implementation, for example, the device IDs of the slave physical devices whose Bluetooth networking relations need to be adjusted contained in the Bluetooth networking strategy are MAC1, MAC2 and MAC3, respectively, and the three device IDs form the first device ID set, i.e., [MAC1, MAC2, MAC3].

S222: searching every slave physical device within a signal coverage of the master physical device and determining a second device ID set made up of device IDs of slave physical devices successfully searched.

The master physical device may scan device IDs of slave physical devices within a signal coverage area of the master physical device. For example, the device IDs of the slave physical devices scanned by the master physical device are MAC1, MAC3, MAC4 and MAC5, and the device IDs of the four slave physical devices form the second device ID set, i.e., [MAC1, MAC3, MAC4, MAC5].

S223: selecting, from the second device ID set, one or more device IDs identical to those in the first device ID set and establishing one or more communication connections with one or more slave physical devices corresponding to the selected one or more device IDs.

In a specific implementation, based on the first device ID set: [MAC1, MAC2, MAC3] determined in the substep S221 and the second device ID set: [MAC1, MAC3, MAC4, MAC5] determined in the substep S222, it may be determined that the device IDs included both in the first device ID set and in the second device ID set are MAC1 and MAC3. As a result, the master physical device will establish communication connections with the slave physical devices corresponding to device IDs of MAC1 and MAC3 respectively, and disconnect the communication connections with the slave physical devices corresponding to MAC4 and MAC5 respectively.

It is noted that when the master physical device failed to find the slave physical device corresponding to MAC2 while scanning all slave physical devices within the signal coverage of the master physical device, and a probable reason for the failure to find the slave device corresponding to MAC2 may be a condition which a malfunction exists in the slave physical device corresponding to MAC2, or a condition in which a variation in a location of the slave physical device corresponding to MAC2 causes the slave physical device to be out of the signal coverage of the master physical device, and the like.

According to the method of controlling Bluetooth networking among physical devices provided by the present disclosure, after the master physical device has received the Bluetooth networking strategy transmitted by the network server, the master physical device adjusts the Bluetooth networking relations between the master physical device and the slave physical devices in accordance with the Bluetooth networking strategy, wherein the Bluetooth networking strategy is selected by the user from the Bluetooth networking strategy list established by the terminal in advance and the Bluetooth networking strategy is transmitted to the network server; the Bluetooth networking strategy list includes one or more Bluetooth networking strategies, and the one or more Bluetooth networking strategies included in the Bluetooth networking strategy list are inputted or selected by the user in accordance with pre-established correspondence relations between the master physical device and the slave physical devices. Thereby, the Bluetooth networking relations between the master physical device and the slave physical devices may be adjusted flexibly by the master physical device in accordance with the Bluetooth networking strategy, and the pairing procedure between the master and slave Bluetooth devices is simplified, thereby enhancing user experience.

To better achieve the remote control of the Bluetooth networking relations among the physical devices in accordance with the Bluetooth networking strategy selected or inputted by a user, the present disclosure proposes, on a basis of the embodiment as shown in FIG. 3a, that the Bluetooth networking strategy further includes a Bluetooth networking mode, and the Bluetooth networking mode includes a mode of establishing a connection automatically, a mode of establishing a connection based on manual operation or a mode of establishing a connection based on time. Further, the present disclosure describes implementation processes of adjusting the Bluetooth networking relations between the master physical device and the slave physical devices in accordance with various Bluetooth networking strategies in detail as follows.

(1) The Bluetooth networking mode is the mode of establishing a connection based on manual operation.

Figure 4A:
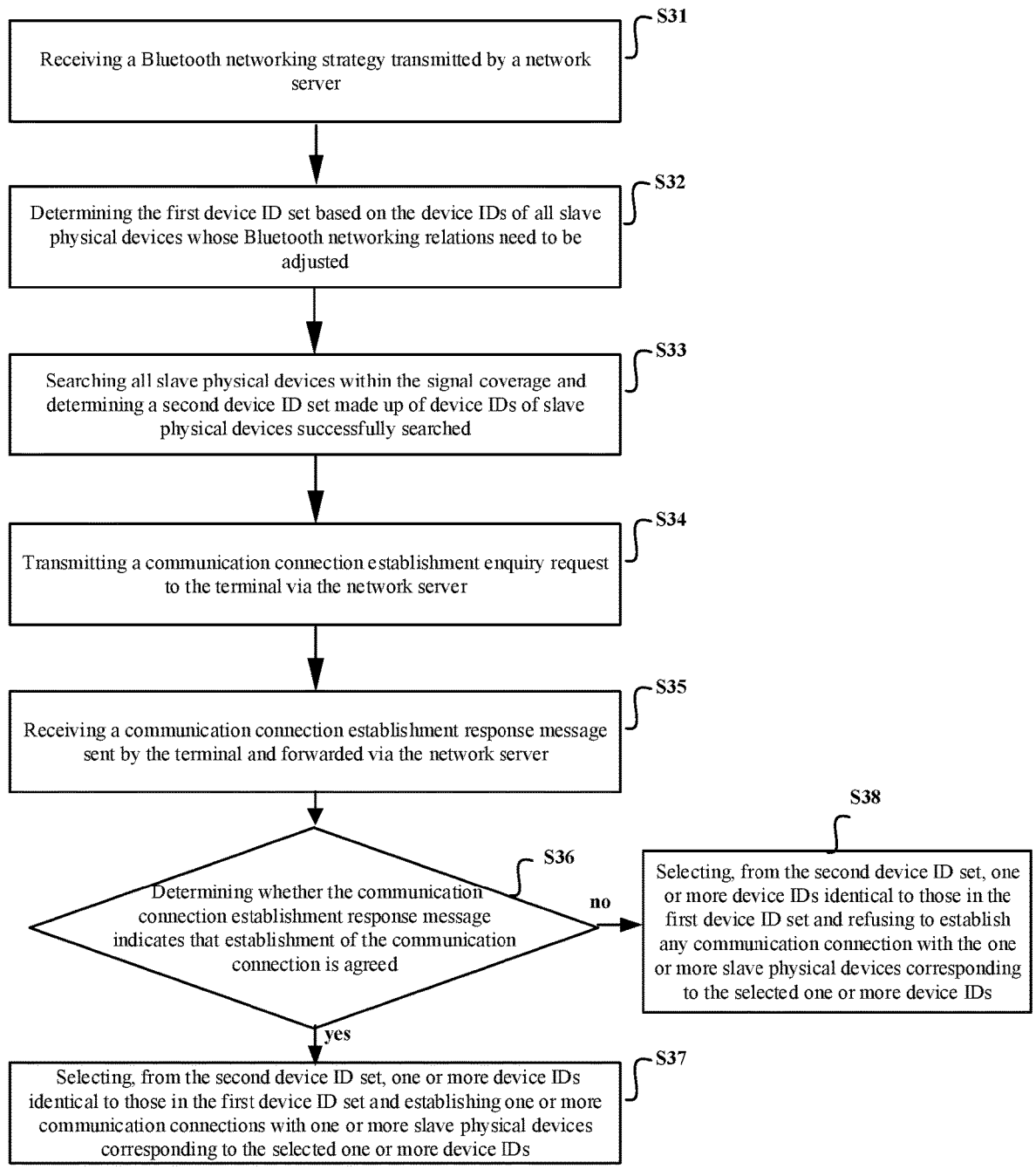
FIG. 4a is a schematic flow diagram of a method of controlling Bluetooth networking among physical devices provided by the present disclosure, wherein a Bluetooth networking mode is a mode of establishing a connection based on manual operation.

As shown in FIG. 4a, FIG. 4a is a schematic flow diagram of a method of adjusting Bluetooth networking relations between the master physical device and the slave physical devices provided by the present disclosure, wherein the Bluetooth networking mode is the mode of establishing a connection based on manual operation. The method may include following steps S31 to S37.

S31: receiving a Bluetooth networking strategy transmitted by a network server.

In a specific implementation, the Bluetooth networking strategy includes the device IDs of all slave physical devices whose Bluetooth networking relations need to be adjusted and the Bluetooth networking mode, and the Bluetooth networking mode is the mode in which the connections is established manually. For example, the device IDs of the slave physical devices whose Bluetooth networking relations need to be adjusted included in the Bluetooth networking strategy are MAC1, MAC2 and MAC3, respectively.

S32: determining the first device ID set based on the device IDs of all slave physical devices whose Bluetooth networking relations need to be adjusted.

In specific, the device IDs of three slave physical devices included in the Bluetooth networking strategy as described in step S31 constitute the first device ID set, i.e., [MAC1, MAC2, MAC3].

S33: searching every slave physical device within the signal coverage of the master physical device and determining a second device ID set made up of device IDs of slave physical devices successfully searched.

The master physical device scans device IDs of all slave physical devices within the signal coverage of the master physical device. For example, the device IDs of the slave physical devices successfully scanned by the master physical device are MAC1, MAC3, MAC4 and MAC5, and the device IDs form the second device ID set, i.e., [MAC1, MAC3, MAC4, MAC5].

S34: transmitting a communication connection establishment enquiry request to the terminal via the network server.

After the master physical device has determined according to the Bluetooth networking strategy that the Bluetooth networking mode is the mode of establishing a connection based on manual operation, the master physical device transmits the communication connection establishment enquiry request to the network server and then the network server transmits the communication connection establishment enquiry request to the terminal.

S35: receiving a communication connection establishment response message sent from the terminal and forwarded via the network server.

After the terminal has received the communication connection establishment enquiry request transmitted by the master physical device, the terminal displays the communication connection establishment enquiry request to the user so that the user may decide whether a communication connection is to be established or not; the terminal detects a click performed by the user as a result of the decision made by the user, and the terminal generates the corresponding communication connection establishment response message and transmits the message to the network server, and the network server forwards the message to the master physical device.

S36: determining whether the communication connection establishment response message indicates that establishment of the communication connection is agreed; if the establishment of the communication connection is agreed, proceeding to step S37; if the establishment of the communication connection is not agreed, proceeding to step S38.

After the master physical device has received the communication connection establishment response message forwarded by the network server, the master physical device determines whether the communication connection establishment response message indicates that the establishment of the communication connection is agreed; if the establishment of the communication connection is agreed, proceeding to step S37; if the establishment of the communication connection is not agreed, proceeding to step S38.

S37: selecting, from the second device ID set, one or more device IDs identical to those in the first device ID set and establishing one or more communication connections with one or more slave physical devices corresponding to the selected one or more device IDs.

In a specific implementation, in the case that it is determined, based on the first device ID set: [MAC1, MAC2, MAC3] and the second device ID set: [MAC1, MAC3, MAC4, MAC5], that the device IDs included both in the first device ID set and in the second device ID set are MAC1 and MAC3, and if the result determined in step S36 is positive, then the master physical device establishes communication connections with the slave physical devices corresponding to device IDs of MAC1 and MAC3 respectively, and disconnects the communication connections with the slave physical devices corresponding to MAC4 and MAC5 respectively.

S38: selecting, from the second device ID set, one or more device IDs identical to those in the first device ID set and refusing to establish any communication connection with the one or more slave physical devices corresponding to the selected one or more device IDs.

If the result determined in step S36 is negative, the master physical device refuses to establish a communication connection with the slave physical devices corresponding to the device IDs of MAC1 and MAC3 respectively, and keeps an existing connection status between the master physical device and currently-connected slave physical devices unchanged.

(2) The Bluetooth networking mode is the mode of establishing a connection based on time.

Figure 4B:
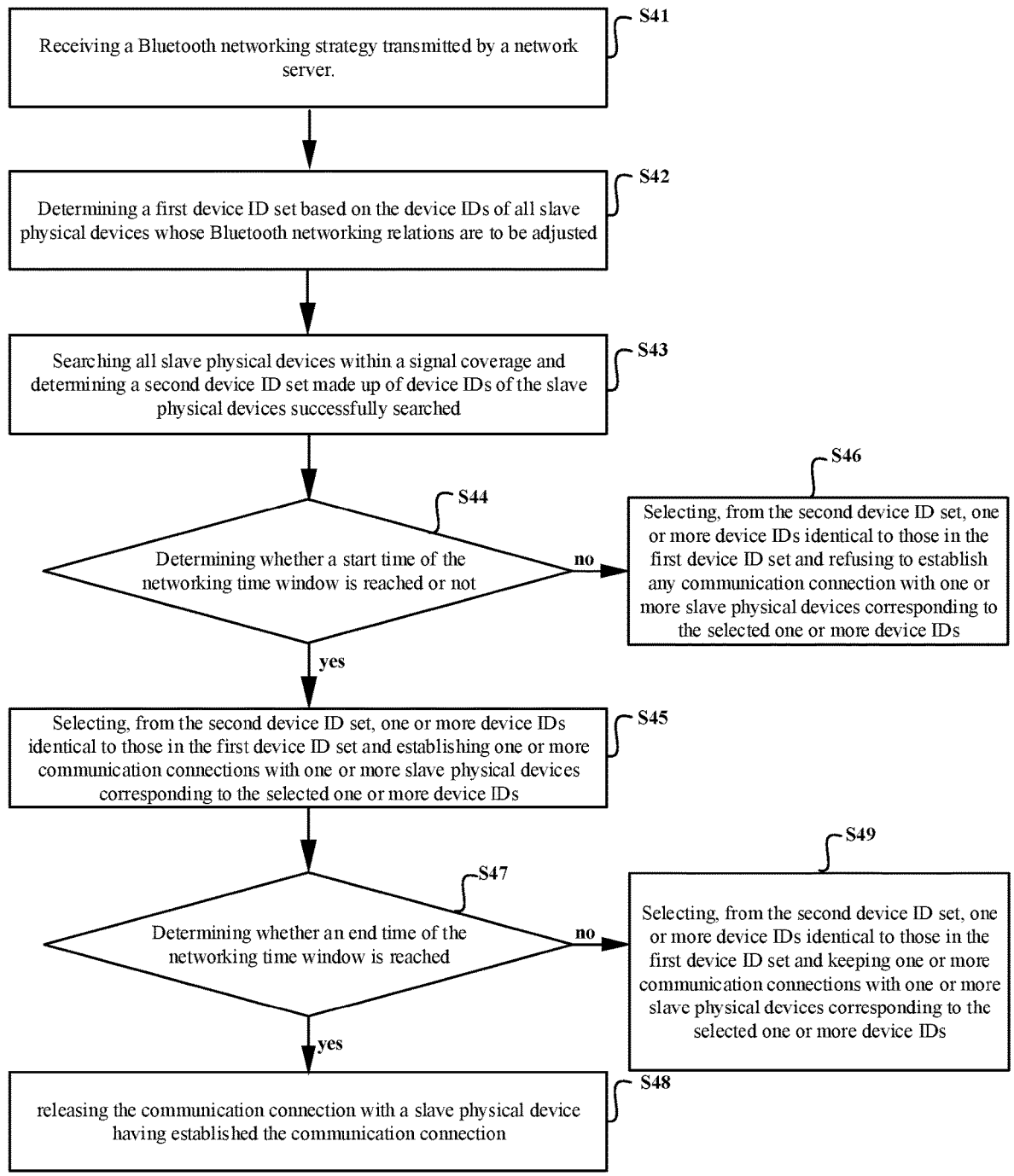
FIG. 4b is a schematic flow diagram of a method of controlling Bluetooth networking among physical devices provided by the present disclosure, wherein the Bluetooth networking mode is a mode of establishing a connection based on time.

As shown in FIG. 4b, FIG. 4b is a schematic diagram of a method of controlling Bluetooth networking among physical devices provided by the present disclosure, wherein the Bluetooth networking mode is the mode of establishing a connection based on time. The method may include following steps S41 to S46.

In the case that the Bluetooth networking mode is the mode of establishing a connection based on time, in the method of controlling Bluetooth networking among physical devices provided by the embodiments of the present disclosure, the Bluetooth networking strategy further includes a networking time window. The networking time window may be any time phase within a range of 0 o'clock to 24 o'clock, i.e., [0, 24] o'clock, any time phase within a range of $1^{st}$ day to $30^{th}$ day or $1^{st}$ day to $31^{st}$ day of a month, i.e., [1, 30] day or [1, 31] day, or a combination of the [0, 24] o'clock and [1, 30] or [1, 31] day. For example, the networking time window may be from 13 o'clock to 16 o'clock (i.e., [13, 16] o'clock), from $1^{st}$ day to $10^{th}$ day (i.e., [1, 10] day), or from 13 o'clock to 16 o'clock (i.e., [13, 16] o'clock) of each day of $1^{st}$ day to $10^{th}$ day (i.e., [1, 10] day). In the embodiment as shown in FIG. 4b, a networking time window from 13 o'clock to 16 o'clock (i.e., [13, 16] o'clock) is taken as an example.

S41: receiving a Bluetooth networking strategy transmitted by a network server.

As for a specific implementation, refer to the description of step S31 and a repeated description is omitted.

S42: determining a first device ID set based on the device IDs of the slave physical devices whose Bluetooth networking relations are to be adjusted.

As for a specific implementation, refer to the description of step S32. The first device ID set determined by the master physical device is [MAC1, MAC2, MAC3].

S43: searching every slave physical device within a signal coverage of the master physical device and determining a second device ID set made up of device IDs of the slave physical devices successfully searched.

Refer to the step S33, and the determined second device ID set is [MAC1, MAC3, MAC4, MAC5].

S44: determining whether a start time of the networking time window is reached or not; if the start time of the networking time window is reached, proceeding to step S45; if the start time of the networking time window is not reached, proceeding to step S46.

As the networking time window is from 13 o'clock to 16 o'clock, the master physical device determines whether the current time is 13 o'clock or not; if the current time is 13 o'clock, the master physical device proceeds to step S45, if the current time is not 13 o'clock, the master physical device proceeds to step S46.

Optionally, if it is determined that the current time is 15 o'clock, since the 15 o'clock is also within the networking time window, then the master physical device also proceeds to step S45.

S45: selecting, from the second device ID set, one or more device IDs identical to those in the first device ID set and establishing one or more communication connections with one or more slave physical devices corresponding to the selected one or more device IDs.

As for a specific implementation, refer to the description of the step S37. In the case that the result determined in step S44 is positive, the master physical device establishes communication connections with the slave physical devices corresponding to device IDs of MAC1 and MAC3, and disconnects the communication connections with the slave physical devices corresponding to MAC4 and MAC5 respectively.

S46: selecting, from the second device ID set, one or more device IDs identical to those in the first device ID set and refusing to establish any communication connection with one or more slave physical devices corresponding to the selected one or more device IDs.

If the result determined in step S44 is negative, the master physical device refuses to establish a communication connection with the slave physical devices corresponding to the device IDs of MAC1 and MAC3, and keeps the existing connection status between the master physical device and the currently-connected slave physical devices unchanged.

Optionally, the method further includes steps S47 to S49.

S47: determining whether an end time of the networking time window is reached; if the end time of the networking time window is reached, proceeding to step S48; if the end time of the networking time window is not reached, proceeding to step S49.

In a specific implementation, based on the networking time window of 13 o'clock to 16 o'clock ([13, 16] o'clock), the master physical device determines whether the current time is 16 o'clock or not; if the current time is or later than 16 o'clock, the end time of the networking time window is reached and the master physical device proceeds to step S48; if the current time is less than 16 o'clock, the end time of the networking time window is not reached, the master physical device proceeds to step S49.

S48, releasing the communication connection with a slave physical device having established the communication connection with the master physical device.

S49: selecting, from the second device ID set, one or more device IDs identical to those in the first device ID set and maintaining one or more communication connections with one or more slave physical devices corresponding to the selected one or more device IDs.

According to the method of controlling Bluetooth networking among physical devices illustrated by FIG. 4b of the present disclosure, the master physical device adjusts the Bluetooth networking relations between the master physical device and the slave physical devices in accordance with various Bluetooth networking strategies. If the Bluetooth networking mode is the mode of establishing a connection based on manual operation, then when the master physical device adjusts the Bluetooth networking relations between the master physical device and the slave physical devices, the master physical device transmits the communication connection establishment enquiry requests to the terminals via the network server, and in the case that the communication connection establishment response messages fed back by the terminals via the network server indicate that the establishment of the communication connection is agreed, the master physical device adjusts the Bluetooth networking relations between the master physical device and the slave physical devices; if the Bluetooth networking mode is the mode of establishing a connection based on time, then when the master physical device adjusts the Bluetooth networking relations between the master physical device and the slave physical devices, the master physical device determines, based on the networking time window, whether the start time of the networking time window is reached or whether the end time of the networking time window is reached, and if the determined result is positive, then the master physical device adjusts the Bluetooth networking relations between the master physical device and the slave physical devices accordingly. Thereby, the master physical device may configure flexibly the Bluetooth networking relations between the master physical device and the slave physical devices based on different Bluetooth networking strategies.

Based on the same inventive concept, the present disclosure further provides a device of controlling Bluetooth networking among physical devices. Since the principle in which the device solves a problem is similar to that in which the method of controlling Bluetooth networking among physical devices solves the problem, the implementation of the device may be learned by referring to the implementation of the method, thus a repeated description is omitted.

Figure 5:
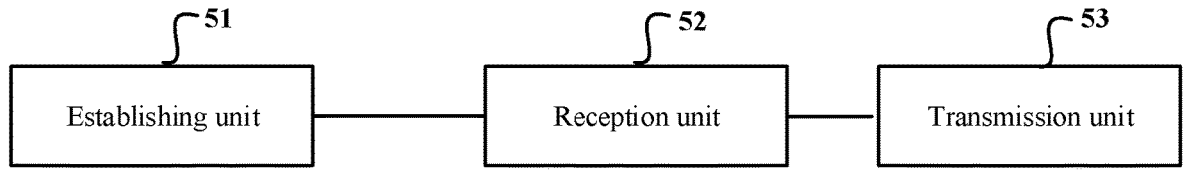
FIG. 5 is a schematic structural diagram of a device of controlling Bluetooth networking among physical devices provided by the present disclosure.

Referring to FIG. 5, FIG. 5 is a schematic structural diagram of a device of controlling Bluetooth networking among physical devices provided by the present disclosure. The device includes an establishing unit 51, a reception unit 52 and a transmission unit 53.

The establishing unit 51 is configured to establish a Bluetooth networking strategy list in advance, wherein the Bluetooth networking strategy list includes one or more Bluetooth networking strategies, and the one or more Bluetooth networking strategies are inputted or selected by a user in accordance with pre-established correspondence relations between a master physical device and slave physical devices. The reception unit 52 is configured to receive a Bluetooth-networking-strategy selection instruction. The transmission unit 53 is configured to transmit, to a network server, a selected Bluetooth networking strategy in accordance with the Bluetooth-networking-strategy selection instruction received by the reception unit 52, such that the Bluetooth networking strategy is forwarded by the network server to the master physical device, wherein the Bluetooth networking strategy is used to trigger the master physical device to adjust Bluetooth networking relations between the master physical device and the slave physical devices.

In a specific implementation, the establishing unit 51 specifically includes an acquisition subunit, an establishing subunit and a transmission subunit. The acquisition subunit is configured to acquire a device identifier (ID) and a corresponding identity ID of each of physical devices to be Bluetooth-networked. The establishing subunit is configured to establish the correspondence relations between the master physical device and the slave physical devices in accordance with the device ID and the corresponding identity ID of each of the physical devices to be Bluetooth-networked acquired by the acquisition subunit. The transmission subunit is configured to transmit the established correspondence relations between the master physical device and the slave physical devices to the network server for storage.

Optionally, the acquisition subunit is specifically configured to acquire, by scanning a graphic authentication code of any physical device of the physical devices to be Bluetooth-networked, a device ID of the physical device; or acquire, by receiving a device code of any physical device of the physical devices to be Bluetooth-networked inputted by the user, the device ID of the physical device.

Optionally, a graphic authentication code is generated based on a Medium Access Control (MAC) address of a physical device, and the graphic authentication code includes a Quick Response (QR) code or a bar code.

For ease of description, parts of the device are divided into respective modules or units in terms of functions of the modules or units and described separately. Of course, the present disclosure may be implemented by integrating the functions of the respective modules or units in one or more software or hardware. For example, the device of controlling Bluetooth networking among physical devices provided by the present disclosure may be implemented in a terminal, and the terminal determines Bluetooth networking relations among physical devices.

Figure 6:
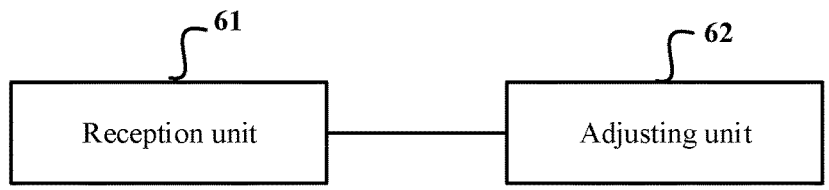
FIG. 6 is a schematic structural diagram of a device of controlling Bluetooth networking among physical devices provided by the present disclosure.

Referring to FIG. 6, FIG. 6 is another schematic structural diagram of a device of controlling Bluetooth networking among physical devices provided by the present disclosure. The device may include a reception unit 61 and an adjusting unit 62.

The reception unit 61 is configured to receive a Bluetooth networking strategy transmitted by a network server, wherein the Bluetooth networking strategy is selected by a user from a Bluetooth networking strategy list established by a terminal in advance and is transmitted to the network server, the Bluetooth networking strategy list includes one or more Bluetooth networking strategies, and one or more Bluetooth networking strategies included in the Bluetooth networking strategy list are inputted or selected by the user in accordance with pre-established correspondence relations between a master physical device and slave physical devices. The adjusting unit 62 is configured to adjust Bluetooth networking relations between the master physical device and the slave physical devices in accordance with the Bluetooth networking strategy received by the reception unit.

In a specific implementation, the Bluetooth networking strategy includes device IDs of all slave physical devices whose Bluetooth networking relations need to be adjusted. The adjusting unit 62 includes specifically a determination subunit, a searching subunit and a selecting subunit. The determination subunit is configured to determine a first device ID set based on the device IDs of the all slave physical devices whose Bluetooth networking relations need to be adjusted. The searching subunit is configured to search every slave physical device within a signal coverage of the master physical device and determine a second device ID set made up of device IDs of slave physical devices successfully searched. The selecting subunit is configured to select, from the second device ID set, one or more device IDs identical to those in the first device ID set and establish one or more communication connections with one or more slave physical devices corresponding to the selected one or more device IDs.

Optionally, the Bluetooth networking strategy further includes a Bluetooth networking mode, and the Bluetooth networking mode includes a mode of establishing a connection automatically, a mode of establishing a connection based on manual operation or a mode of establishing a connection based on time.

Optionally, the device further includes a transmission unit and a determination unit. The transmission unit is configured to, in a case that the Bluetooth networking mode is the mode of establishing a connection based on manual operation and before the selecting subunit selects, from the second device ID set, one or more device IDs identical to those in the first device ID set and establish one or more communication connections with one or more slave physical devices corresponding to the selected one or more device IDs, transmit a communication connection establishment enquiry request to a terminal via the network server. The reception unit is further configured to receive a communication connection establishment response message forwarded by the terminal via the network server. The determination unit is configured to determine the communication connection establishment response message indicates that establishment of the communication connection is agreed.

Optionally, in the case that the Bluetooth networking mode is the mode of establishing a connection based on time, the Bluetooth networking strategy further includes a networking time window; and the selecting subunit is specifically configured to, in a case that a start time of the networking time window reaches, select, from the second device ID set, one or more device IDs identical to those in the first device ID set according to the networking time window and establish one or more communication connections with one or more slave physical devices corresponding to the selected one or more device IDs. The device further includes a releasing unit. The releasing unit is configured to release, according to the networking time window, the communication connection with a slave physical device having established the communication connection with the master physical device, when an end time of the networking time window is reached.

For ease of description, parts of the device are divided into respective modules or units in terms of functions of the modules or units and described separately. Of course, the present disclosure may be implemented by integrating the functions of the respective modules or units in one or more software or hardware. For example, the device of controlling Bluetooth networking among physical devices provided by the embodiment as shown in FIG. 6 of the present disclosure may be arranged in a master physical device, and the master physical device adjusts Bluetooth networking relations between the master physical device and the slave physical devices in accordance with the Bluetooth networking strategy determined by the terminal.

Figure 7:
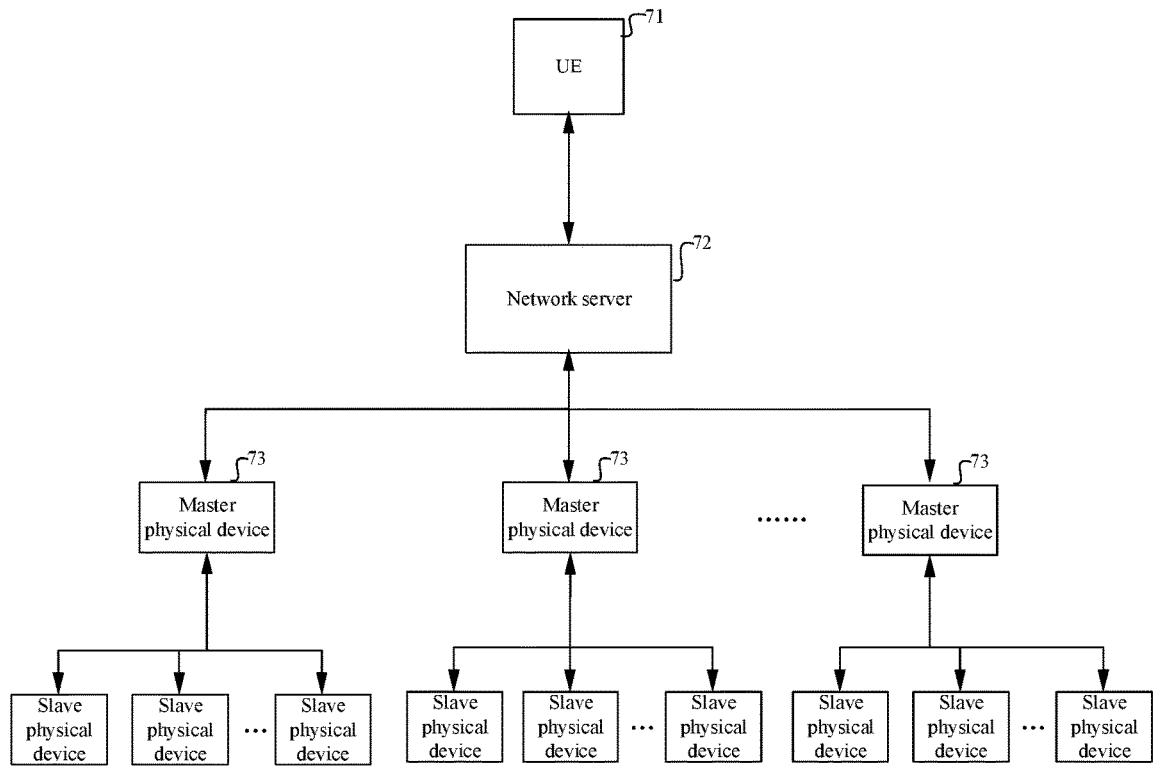
FIG. 7 is a schematic structural diagram of a system of controlling Bluetooth networking among physical devices provided by the present disclosure.

Referring to FIG. 7, FIG. 7 is a schematic structural diagram of a system of controlling Bluetooth networking among physical devices provided by the present disclosure. The system includes a terminal 71, a network server 72 and one or more master physical devices 73, wherein each of the one or more master physical devices is connected to one or more slave physical devices. The terminal 71 is configured to establish a Bluetooth networking strategy list in advance, wherein the Bluetooth networking strategy list includes one or more Bluetooth networking strategies, and the one or more Bluetooth networking strategies are input or selected by a user in accordance with pre-established correspondence relations between the master physical device 73 and the one or more slave physical devices; receive a Bluetooth-networking-strategy selection instruction; and transmit, to the network server 72, a selected Bluetooth networking strategy in accordance with the Bluetooth-networking-strategy selection instruction.

In a specific implementation, the terminal 71 includes a user device registration module, a user device management module, a scenario switching module and the like. Through configuration, a visual UI (User Interface) for interaction with a user is provided to the user, the user device registration module is configured to perform registration of physical devices and then establish correspondence relations between the master physical device 73 and the slave physical devices after the registration. The user device management module is configured to manage the physical devices. If the terminal 71 receives a message from the master physical device 73 forwarded via the network server 72, the message indicates that several slave physical devices are newly found within the signal coverage of the master physical device 73, the user device registration module in the terminal 71 registers the newly found slave physical devices and then the user device management module updates correspondence relations between the master physical device 73 and the slave physical devices. The scenario switching module is configured to manage the Bluetooth networking strategy. The terminal 71 is also configured to transmit to the network server 72 the correspondence relations between the master physical device and the slave physical devices and the Bluetooth networking strategy list configured in the terminal 71 so that the network service backs up the correspondence relations and the Bluetooth networking strategy list and transmits the correspondence relations and the Bluetooth networking strategy list to the master physical device 73.

The network server 72 is configured to receive the selected Bluetooth networking strategy transmitted by the terminal, and forward the Bluetooth networking strategy to the master physical device 73.

In a specific implementation, the network server 72 includes a device management module, a user management module, a service configuration module and a data reception-transmission converting module. The data reception-transmission converting module is configured to receive data information transmitted by the one or more master physical devices 73; or receive control information transmitted by the terminal 71; or transmit certain data information to the terminal 71; or transmit certain data information or control information or downlink direction information to a corresponding master physical device 73.

Each of the one or more master physical devices 73 is configured to receive a Bluetooth networking strategy transmitted by the network server 72, and adjust Bluetooth networking relations between the master physical device and the slave physical devices in accordance with the Bluetooth networking strategy.

In a specific implementation, the master physical device 73 includes a digital signal transceiver module, a network communication module, a control module and a power supply module. The digital signal transceiver module is configured to perform data information interaction with the network server 72, or perform data information interaction with the slave physical devices; the control module is configured to control access and exit of a slave physical device; the power supply module is configured to power the master physical device; the network communication module is configured to communicate with a remote network server by receiving or transmitting network signals.

Further, in the case that the Bluetooth networking strategy is changed, the terminal 71 transmits a new Bluetooth networking strategy to the network server 72 for update and storage, and then the network server 72 transmits the new Bluetooth networking strategy to the master physical device 73. The master physical device refreshes a built-in control module in the master physical device with the new Bluetooth networking strategy and then adjusts the Bluetooth networking relations between the master physical device and the slave physical devices according to the new Bluetooth networking strategy.

In specific, each of the slave physical devices includes a network communication module, a power supply module and a control module. The network communication module is configured to transmit a device ID of the slave physical device to the master physical device 73; or transmit uplink direction information to the master physical device 73; or receive data information transmitted by the master physical device 73. The power supply module is configured to power the slave physical device.

Optionally, the master physical device may be a master Bluetooth device (a Master device), the slave physical device may be a slave Bluetooth device (a Slave device), and the Master device may further include a Bluetooth module. The Bluetooth module is configured to scan Slave devices in a signal coverage of the Master device and pair with the Slave device. The Master device may also be configured to download current pairing relations between the Master device and the Slave devices from the network server 72 or transmit the pairing relations between the Master device and the Slave devices to the network server 72. The Master device is also configured to control the access and the exist of the Slave device; perform Bluetooth information interaction with the Slave device; and perform data signal interaction with the network server 72.

Optionally, the terminal 71 is specifically configured to acquire a device ID and a corresponding identity ID of each of physical devices to be Bluetooth-networked; and establish a correspondence relation between the master physical device 73 and the slave physical device in accordance with the acquired device ID and corresponding identity ID of each of the physical devices to be Bluetooth-networked.

In a specific implementation, the terminal 71 is configured to transmit the correspondence relations between the master physical device 73 and the slave physical devices to the network server 72; and the network server 72 is configured to store the correspondence relations between the master physical device 73 and the slave physical devices transmitted by the terminal.

Optionally, the terminal 71 is specifically configured to acquire the device ID of any one of the physical devices to be Bluetooth-networked by scanning a graphic authentication code of the physical device; or acquire the device ID of any one of the physical devices to be Bluetooth-networked by receiving a device code of the physical device inputted by the user.

In a specific implementation, the graphic authentication code is generated based on a Medium Access Control (MAC) address of the physical device, and the graphic authentication code includes QR code or bar code.

Optionally, the Bluetooth networking strategy includes device IDs of all slave physical devices whose Bluetooth networking relations need to be adjusted. The master physical device 73 is specifically configured to: determine a first device ID set based on the device IDs of the slave physical devices whose Bluetooth networking relations need to be adjusted; search every slave physical device within a signal coverage and determine a second device ID set made up of device IDs of slave physical devices successfully searched; and select, from the second device ID set, one or more device IDs identical to those in the first device ID set and establish one or more communication connections with one or more slave physical devices corresponding to the selected one or more device IDs.

Optionally, the Bluetooth networking strategy further includes a Bluetooth networking mode, and the Bluetooth networking mode includes a mode of establishing a connection automatically, a mode of establishing a connection based on manual operation or a mode of establishing a connection based on time.

In a specific implementation, the master physical device 73 is specifically configured to: if the Bluetooth networking mode is the mode of establishing a connection based on manual operation, then before the master physical device 73 selects, from the second device ID set, one or more device IDs identical to those in the first device ID set and establish one or more communication connections with one or more slave physical devices corresponding to the selected one or more device IDs, transmit a communication connection establishment enquiry request to the network server 72; receive a communication connection establishment response message forwarded via the network server 72; and determine the communication connection establishment response message indicates that establishment of the communication connection is agreed.

In a specific implementation, the master physical device 73 receives a downlink control instruction transmitted by the network server 72 and responds according to the downlink control instruction, wherein the downlink control instruction includes a device-connection push notification, a device-disconnection push notification, a strategy change notification and a device management notification.

The network server 72 is specifically configured to transmit the communication connection establishment enquiry request to the terminal 71, receive the communication connection establishment response message transmitted by the terminal 71, and forward the communication connection establishment response message to the master physical device 73.

The terminal 71 is specifically configured to receive the communication connection establishment enquiry request transmitted by the network server 72 and transmit the communication connection establishment response message to the network server 72.

In a specific implementation, in the case that the Bluetooth networking mode is the mode of establishing a connection based on time, the Bluetooth networking strategy further includes a networking time window; the master physical device 73 is specifically configured to: in a case that a start time of the networking time window reaches, select, from the second device ID set, one or more device IDs identical to those in the first device ID set according to the networking time window and establish one or more communication connections with one or more slave physical devices corresponding to the selected one or more device IDs; and is further configured to release, according to the networking time window, the communication connection with a slave physical device having established the communication connection with the master physical device, when an end time of the networking time window is reached.

According to the system of controlling Bluetooth networking among physical devices provided by the embodiment as shown in FIG. 7 of the present disclosure, the terminal establishes a Bluetooth networking strategy list in advance, wherein the Bluetooth networking strategy list includes one or more Bluetooth networking strategies, and the one or more Bluetooth networking strategies are inputted or selected by a user in accordance with pre-established correspondence relations between the master physical device and slave physical devices; after the terminal has established the Bluetooth networking strategy list, the terminal receives a Bluetooth-networking-strategy selection instruction; and the terminal transmits a selected Bluetooth networking strategy in accordance with the Bluetooth-networking-strategy selection instruction to a network server, such that the Bluetooth networking strategy is forwarded by the network server to the master physical device; after the master physical device has received the Bluetooth networking strategy transmitted by the network server, the master physical device adjusts Bluetooth networking relations between the master physical device and the slave physical devices according to the Bluetooth networking strategy. Thereby, the Bluetooth networking relations between the master physical device and the slave physical devices may be controlled remotely, and the pairings between the master physical devices and slave physical devices may be achieved through a remote operation; in addition, the Bluetooth networking relations between the master physical device and the slave physical devices may be configured flexibly with the aid of various Bluetooth networking strategies, thus enhancing user experience.

Figure 8:
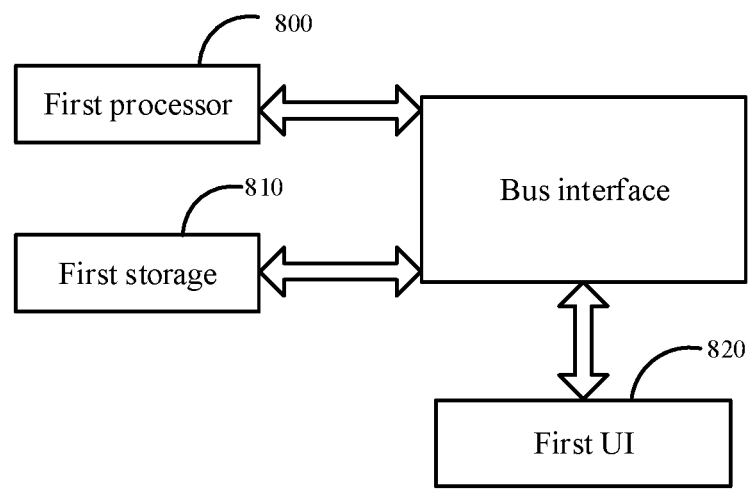
FIG. 8 is a schematic structural diagram of a device of controlling Bluetooth networking among physical devices provided by the present disclosure.

Referring to FIG. 8, FIG. 8 is a schematic structural diagram of a device of controlling Bluetooth networking among physical devices provided by the present disclosure. The device includes: a first processor 800, a first storage 810, a first User Interface (UI) 820 and a bus interface, wherein the first processor 800, the first storage 810 and the first UI 820 are configured to communicate with each other through the bus interface, and the first processor 800 is configured to read and execute programs in the first storage 810 to control the device to implement the following process: establishing a Bluetooth networking strategy list in advance, wherein the Bluetooth networking strategy list includes one or more Bluetooth networking strategies, and the one or more Bluetooth networking strategies are inputted or selected by a user in accordance with pre-established correspondence relations between a master physical device and slave physical devices; receiving a Bluetooth-networking-strategy selection instruction; and transmitting a selected Bluetooth networking strategy to a network server in accordance with the Bluetooth-networking-strategy selection instruction, such that the Bluetooth networking strategy is forwarded by the network server to the master physical device, wherein the Bluetooth networking strategy is used to trigger the master physical device to adjust Bluetooth networking relations between the master physical device and the slave physical devices.

In FIG. 8, a bus architecture may include any number of interconnected buses and bridges, specifically various circuits including one or more processors represented by the first processor 800 and storages represented by the first storage 810 are connected to each other. The bus architecture may also connect various other circuits such as peripheral devices, voltage regulators and power management circuits, which is well known in the art. Therefore, a detailed description thereof is omitted herein. The bus interface provides an interface. The first UI 820 may also be an interface capable of connecting externally or internally to a required device, and the device which may be connected by the first UI includes, but is not limited to: a keypad, a display, a speaker, a microphone, a joystick and the like.

The first processor 800 is responsible for supervising the bus architecture and normal operations, and the first storage 810 may be configured to store data being used by the first processor 800 during operation of the first processor 800.

After the device of controlling Bluetooth networking among physical devices as shown in FIG. 8 has received the Bluetooth-networking-strategy selection instruction, the device transmits the selected Bluetooth networking strategy to the network server, thereby a remote control of the Bluetooth networking relations between the master physical device and the slave physical devices may be achieved. The selected Bluetooth networking strategy is forwarded by the network server to the master physical device.

The first processor 800 is further configured to read and execute a program in the first storage 810 to control the device to implement the following steps: transmitting the established correspondence relations between the master physical device and the slave physical devices to the network server for storage. Thus, the network server may store and backup the correspondence relations between the master physical device and the slave physical devices.

Figure 1:
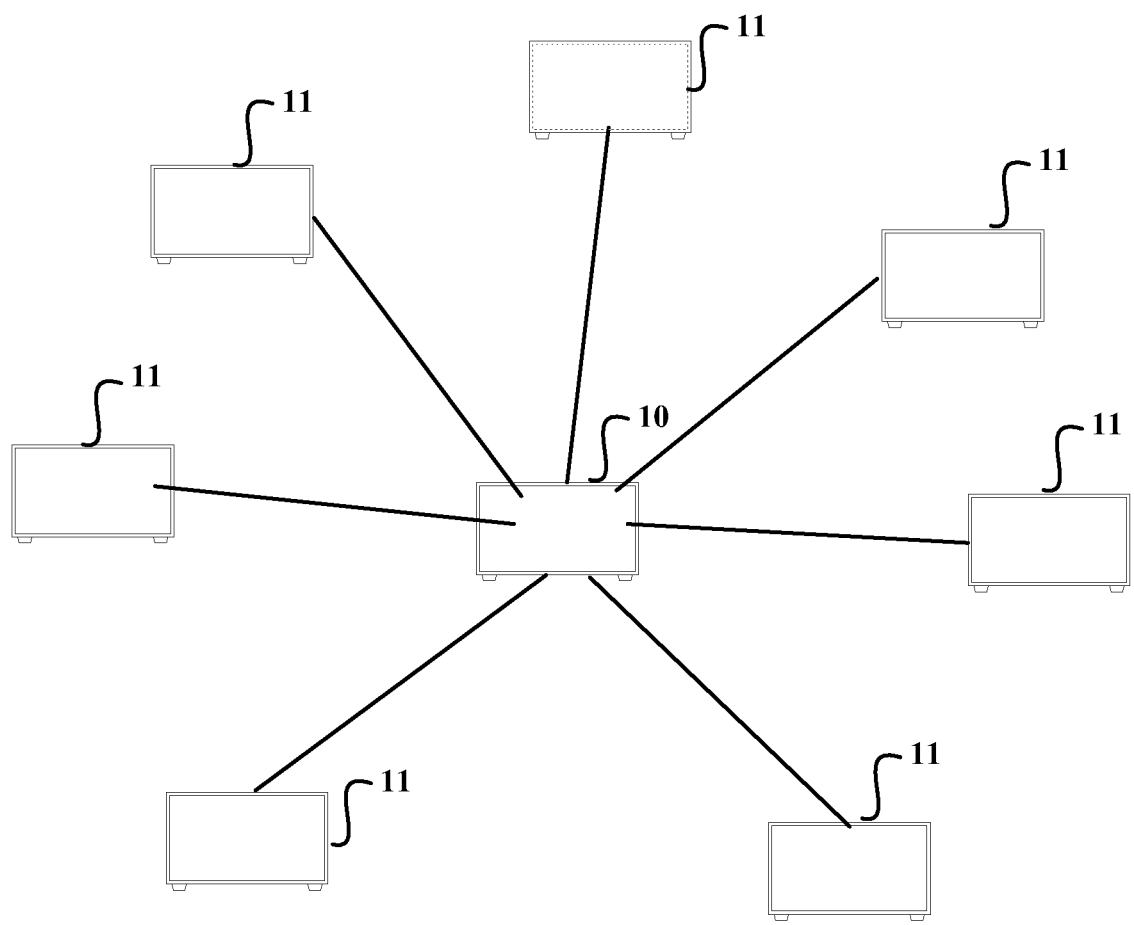
FIG. 1 is a schematic structural diagram of a deployment scenario of a Master device and Slave devices in related art.

The device of controlling Bluetooth networking among physical devices provided by the present disclosure may be a device configured to implement the method of controlling Bluetooth networking among physical devices as described above with respect to FIG. 1, e.g., a terminal. The device may control remotely the Bluetooth networking relations between the master physical device and the slave physical devices, and achieve the pairings of the master physical device and the slave physical devices through remote operation. In addition, the Bluetooth networking relations between the master physical device and the slave physical device may be configured flexibly with the aid of various Bluetooth networking strategies, thus enhancing user experience.

Figure 9:
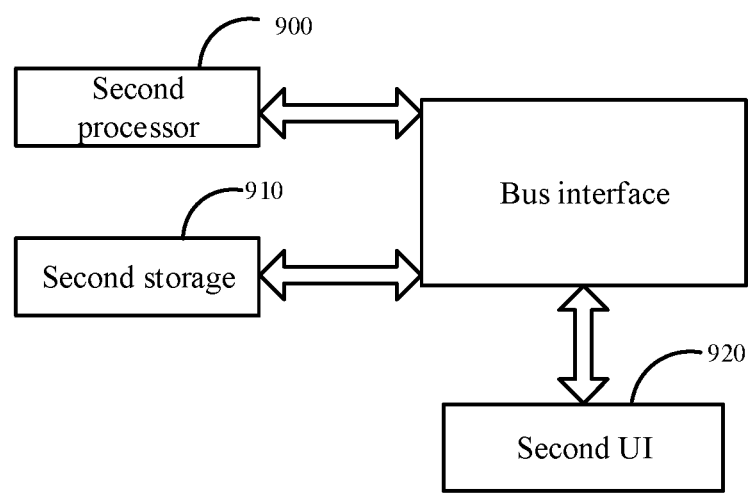
FIG. 9 is a schematic structural diagram of a device of controlling Bluetooth networking among physical devices provided by the present disclosure.

Referring to FIG. 9, FIG. 9 is a schematic structural diagram of a device of controlling Bluetooth networking among physical devices provided by the present disclosure. The device includes: a second processor 900, a second storage 910, a second UI 920 and a bus interface, wherein the second processor 900, the second storage 910 and the second UI 920 are configured to communicate with each other through the bus interface, and the second processor 900 is configured to read and execute a program in the second storage 910 to control the device to implement the following steps: receiving a Bluetooth networking strategy transmitted by a network server, wherein the Bluetooth networking strategy is selected by a user from a Bluetooth networking strategy list established by the terminal in advance and is transmitted to the network server, the Bluetooth networking strategy list includes one or more Bluetooth networking strategies, and one or more Bluetooth networking strategies included in the Bluetooth networking strategy list are inputted or selected by the user in accordance with pre-established correspondence relations between a master physical device and slave physical devices; adjusting the Bluetooth networking relations between the master physical device and the slave physical devices in accordance with the Bluetooth networking strategy.

In FIG. 9, a bus architecture may include any number of interconnected buses and bridges, specifically connects various circuits including one or more processors represented by the second processor 900 and storages represented by the second storage 910 to each other. The bus architecture may also connect various other circuits such as peripheral devices, voltage regulators and power management circuits, which are well known in the art. Therefore, a detailed description thereof is omitted herein. The bus interface provides an interface. The second UI 920 may also be an interface capable of connecting externally or internally to a required device, and the device which may be connected to the second UI 920 includes, but not limited to: a keypad, a display, a speaker, a microphone, a joystick and the like.

The second processor 900 is responsible for supervising the bus architecture and normal operations, and the second storage 910 may be configured to store data being used by the second processor 900 during operation of the second processor 900.

The device of controlling Bluetooth networking among physical devices provided by the embodiment of the present disclosure may be a device configured to implement the method of controlling Bluetooth networking among physical devices as described above with respect to FIG. 3, e.g., a master physical device. Thus, the master physical device may adjust flexibly Bluetooth networking relations between the master physical device and the slave Bluetooth devices according to the Bluetooth networking strategies, and the pairings between the master physical device and the slave Bluetooth devices are simplified, thereby enhancing user experience.

It may be appreciated by one of ordinary skills in the art that roles of the master physical devices and the slave physical devices are only logical roles of the physical devices in the Bluetooth networking within a specific time duration. A physical device does not necessarily always play a role of a master physical device or a role of a slave physical device. The role of the physical device may transition from the slave physical device to the master physical device or from the master physical device to the slave physical device. In a Bluetooth MESH network, a Lower-Power node generally plays the role of the slave physical device, a Proxy node, a Relay node, or a Friend node may play the role of the slave physical device or the role of the master physical device. As only as a device or a system of controlling Bluetooth networking among physical devices is provided with the above functions in the present application, the device or the system of controlling Bluetooth networking among physical devices are within the protection scope of the present disclosure.

The device and the system of controlling Bluetooth networking among physical devices provided by embodiments of the present disclosure may be implemented with computer programs. It may be appreciated by a person skilled in the art that the described module division mode is merely one of many module division modes, embodiments in which a different division mode is utilized or no division is applied shall fall within the protection scope of this application as long as the device and the system of controlling Bluetooth networking among physical devices have foregoing functions.

It should be appreciated by a person skilled in the art that embodiments of the present disclosure may be provided as a method, a system or a computer program product. Thus, the present disclosure may take forms of a complete hardware embodiment, a complete software embodiment, or a combination of software and hardware embodiments. Further, the present disclosure may take a form of a computer program product implemented on one or more computer readable storage media (including, but not limited to: a disk storage, a CD-ROM, an optical storage, etc.) containing computer readable program codes.

The present disclosure is described with reference to flow diagrams and/or block diagrams of the method, the device (system) and the computer program product according to embodiments of the present disclosure. It is understood, each process and/or each block in the flow diagrams and/or block diagrams and a combination of processes and/or blocks in the flow diagrams and/or block diagrams may be implemented by computer program instructions. The computer program instructions may be provided to a general purpose computer, a special-purpose computer, an embedded processor, or a processor of another programmable data processing device to generate a machine, such that instructions executed by the general purpose computer or the processor of another programmable data processing device generate a device suitable for achieving the functions specified in one or more processes of the flow diagrams and/or one or more blocks of the block diagrams.

These computer program instructions may also be stored in a computer readable storage configured to cause a computer or another programmable data processing device to operate in specific manner, such that the instructions stored in the computer readable storage generate an article of manufacture including an instruction apparatus. The instruction apparatus achieves the functions specified in one or more processes of the flow diagrams and/or one or more blocks of the block diagrams. The computer readable storage described herein may include any one of a volatile storage, a non-volatile storage, a transient storage or a non-transient storage.

The computer program instructions may be loaded to a computer or another programmable data processing device, such that a series of operations and steps are performed on the computer or the another programmable data processing device to realize a computer-implemented processing operation, thereby the instructions executed on the computer or the another programmable data processing device provide steps configured to implement the functions specified in one or more processes of the flow diagrams and/or one or more blocks of the block diagrams.

Although optional embodiments of the present disclosure are described, the embodiments may be replaced and modified by a person skilled in the art having the benefit of basic inventive concept of the present disclosure. Thus, the appended claims are to be construed as encompassing the optional embodiments and any replacements and modifications within the scope of the present disclosure.

It is obvious, various modifications and replacements may be made in the embodiments by a person skilled in the art without departing from the sprite and principle of the present disclosure. If these modifications and replacements fall within the scope of the claims of the present disclosure and equivalents thereof, the present disclosure is intended to encompass the modifications and replacements.

What is claimed is:

1. A method of controlling Bluetooth networking among physical devices, comprising:
   receiving a Bluetooth networking strategy transmitted by a network server, wherein the Bluetooth networking strategy is selected by a user from a Bluetooth networking strategy list established by a terminal in advance and is transmitted to the network server, the Bluetooth networking strategy list comprises one or more Bluetooth networking strategies, and the one or more Bluetooth networking strategies comprised in the Bluetooth networking strategy list are inputted or selected by the user in accordance with a pre-established correspondence relation between a master physical device and a slave physical device,
   wherein the Bluetooth networking strategy comprises a Bluetooth networking mode, and the Bluetooth networking mode comprises a mode of establishing a connection based on manual operation or a mode of establishing a connection based on time,
   in a case that the Bluetooth networking mode is the mode of establishing the connection based on manual operation, the method further comprises:
     transmitting a communication connection establishment enquiry request to the terminal via the network server;
     receiving a communication connection establishment response message sent from the terminal and forwarded by the network server; and
     determining the communication connection establishment response message indicates that establishment of a communication connection is agreed; and
     adjusting a Bluetooth networking relation between the master physical device and the slave physical device;
   in a case that the Bluetooth networking mode is the mode of establishing the connection based on time, the Bluetooth networking strategy further comprises a networking time window; and the method further comprises:
     determining, based on the networking time window, whether a start time of the networking time window is reached or whether an end time of the networking time window is reached; and
     if the start time of the networking time window or the end time of the networking time window is reached, adjusting a Bluetooth networking relation between the master physical device and the slave physical device.

2. The method according to claim 1, wherein the Bluetooth networking strategy further comprises device identifiers (IDs) of all slave physical devices whose Bluetooth networking relations need to be adjusted; and
   the adjusting the Bluetooth networking relation between the master physical device and the slave physical device in accordance with the Bluetooth networking strategy, comprises:
   determining a first device ID set based on device IDs of all slave physical devices whose Bluetooth networking relations need to be adjusted;
   searching all slave physical devices within a signal coverage and determining a second device ID set made up of device IDs of slave physical devices successfully searched; and
   selecting, from the second device ID set, a device ID identical to any device ID in the first device ID set and establishing a communication connection with a slave physical device corresponding to the selected device ID.

3. The method according to claim 2, wherein in a case that the Bluetooth networking mode is the mode of establishing the connection based on the manual operation,
   transmitting the communication connection establishment enquiry request to the terminal via the network server is performed after searching the all slave physical devices within the signal coverage and determining the second device ID set made up of device IDs of slave physical devices successfully searched and before selecting, from the second device ID set, the device ID identical to any device ID in the first device ID set and establishing the communication connection with the slave physical device corresponding to the selected device ID;
   determining the communication connection establishment response message indicating that establishment of the communication connection is agreed is performed before selecting, from the second device ID set, the device ID identical to any device ID in the first device ID set and establishing the communication connection with the slave physical device corresponding to the selected device ID.

4. The method according to claim 1, wherein the Bluetooth networking strategy further comprises device identifiers (IDs) of all slave physical devices whose Bluetooth networking relations need to be adjusted, and
   in a case that the Bluetooth networking mode is the mode of establishing the connection based on time, before determining, based on the networking time window, whether the start time of the networking time window or the end time of the networking time window is reached, the method further comprises:
   determining a first device ID set based on device IDs of all slave physical devices whose Bluetooth networking relations need to be adjusted;
   searching all slave physical devices within a signal coverage and determining a second device ID set made up of device IDs of slave physical devices successfully searched;
   and
   adjusting the Bluetooth networking relation between the master physical device and the slave physical device comprises: selecting, from the second device ID set according to the networking time window, the device ID identical to any device ID in the first device ID set and establishing the communication connection with the slave physical device corresponding to the selected device ID; or releasing, according to the networking time window, the communication connection with the slave physical device having established the communication connection, when the end time of the networking time window is reached.

5. A system of controlling Bluetooth networking among physical devices, comprising:
a terminal, a network server and at least one master physical device, wherein each of the at least one master physical device is connected to one or more slave physical devices,
the terminal is configured to establish a Bluetooth networking strategy list in advance, wherein the Bluetooth networking strategy list comprises one or more Bluetooth networking strategies, and the one or more Bluetooth networking strategies are inputted or selected by a user in accordance with a pre-established correspondence relation between the master physical device and the slave physical device; receive a Bluetooth-networking-strategy selection instruction; and transmit, to a network server, a selected Bluetooth networking strategy in accordance with the Bluetooth-networking-strategy selection instruction;
the network server is configured to receive the selected Bluetooth networking strategy transmitted by the terminal, and forward the Bluetooth networking strategy to the master physical device; and
the master physical device is configured to receive the Bluetooth networking strategy transmitted by the network server,
wherein the Bluetooth networking strategy comprises a Bluetooth networking mode, and the Bluetooth networking mode comprises a mode of establishing a connection based on manual operation or a mode of establishing a connection based on time,
wherein in a case that the Bluetooth networking mode is the mode of establishing the connection based on manual operation, the master physical device is further configured to transmit a communication connection establishment enquiry request to the network server; receive a communication connection establishment response message sent from the terminal and forwarded by the network server; and determine the communication connection establishment response message indicates that establishment of the communication connection is agreed, and adjusting a Bluetooth networking relation between the master physical device and the slave physical device;
in a case that the Bluetooth networking mode is the mode of establishing the connection based on time, the Bluetooth networking strategy further comprises a networking time window;
the master physical device is further configured to: determine, based on the networking time window, whether a start time of the networking time window is reached or whether an end time of the networking time window is reached; and
if the start time of the networking time window or the end time of the networking time window is reached, adjust a Bluetooth networking relation between the master physical device and the slave physical device.

6. The system according to claim 5, wherein
the terminal is specifically configured to acquire a device identifier (ID) and a corresponding identity ID of each physical device to be Bluetooth-networked; establish the correspondence relation between the master physical device and the slave physical device in accordance with the acquired device ID and the corresponding identity ID of the physical device to be Bluetooth-networked; and transmit the established correspondence relation between the master physical device and the slave physical device to the network server; and
the network server is further configured to store the correspondence relation between the master physical device and the slave physical device transmitted by the terminal.

7. The system according to claim 6, wherein, the terminal is specifically configured to:
acquire the device ID of the physical device to be Bluetooth-networked by scanning a graphic authentication code of the physical device; or
acquire the device ID of the physical device to be Bluetooth-networked by receiving a device code of the physical device inputted by the user.

8. The system according to claim 7, wherein the graphic authentication code is generated based on a Medium Access Control (MAC) address of the physical device, and the graphic authentication code comprises a Quick Response code or a bar code.

9. The system according to claim 5, wherein the Bluetooth networking strategy further comprises device identifiers (IDs) of all slave physical devices whose Bluetooth networking relations need to be adjusted; and
the master physical device is specifically configured to determine a first device ID set based on device IDs of all slave physical devices whose Bluetooth networking relations need to be adjusted; search all slave physical devices within a signal coverage and determine a second device ID set made up of device IDs of slave physical devices successfully searched; and select, from the second device ID set, a device ID identical to any device ID in the first device ID set and establish a communication connection with a slave physical device corresponding to the selected device ID.

10. The system according to claim 9, wherein, in a case that the Bluetooth networking mode is the mode of establishing the connection based on the manual operation, the master physical device is specifically configured to transmit the communication connection establishment enquiry request to the network server, after the master physical device searches the all slave physical devices within the signal coverage and determines the second device ID set made up of device IDs of slave physical devices successfully searched and before the master physical device selects, from the second device ID set, the device ID identical to any device ID in the first device ID set and establishes the communication connection with the slave physical device corresponding to the selected device ID; and the master physical device is specifically configured to determine the communication connection establishment response message indicating that establishment of the communication connection is agreed before the master physical device selects, from the second device ID set, the device ID identical to any device ID in the first device ID set and establishing the communication connection with the slave physical device corresponding to the selected device ID
the network server is specifically configured to transmit the communication connection establishment enquiry request to the terminal; receive the communication connection establishment response message transmitted by the terminal; and forward the communication connection establishment response message to the master physical device; and the terminal is specifically configured to receive the communication connection establishment enquiry request transmitted by the network server and transmit the communication connection establishment response message to the network server.

11. The system according to claim 5, wherein the Bluetooth networking strategy further comprises device identifiers (IDs) of all slave physical devices whose Bluetooth networking relations need to be adjusted, and in a case that the Bluetooth networking mode is the mode of establishing the connection based on time, the master physical device is further configured to, before the master physical device determines, based on the networking time window, whether the start time of the networking time window or the end time of the networking time window is reached, determine a first device ID set based on device IDs of all slave physical devices whose Bluetooth networking relations need to be adjusted;

search all slave physical devices within a signal coverage and determining a second device ID set made up of device IDs of slave physical devices successfully searched, the master physical device specifically configured to: select, from the second device ID set according to the networking time window, the device ID identical to any device ID in the first device ID set and establish the communication connection with the slave physical device corresponding to the selected device ID; or release, according to the networking time window, the communication connection with the slave physical device having established the communication connection, when the end time of the networking time window is reached.

12. A device of controlling Bluetooth networking among physical devices, comprising:

a processor, a storage, configured to store a program and data, and a bus interface, configured to allow for communication between the processor and the storage, wherein the processor is configured to read and execute the program and data stored in the storage, to control the device to implement the method according to claim 1.

* * * * *